United States Patent [19]
Yamakawa et al.

[11] Patent Number: 5,892,595
[45] Date of Patent: Apr. 6, 1999

[54] IMAGE READING APPARATUS FOR CORRECT POSITIONING OF COLOR COMPONENT VALUES OF EACH PICTURE ELEMENT

[75] Inventors: Shinji Yamakawa, Kanagawa; Koichi Noguchi, Tokyo; Shinichiro Wada, Kanagawa, all of Japan

[73] Assignee: Ricoh Company, Ltd., Tokyo, Japan

[21] Appl. No.: 898,091

[22] Filed: Jul. 23, 1997

Related U.S. Application Data

[63] Continuation-in-part of Ser. No. 778,762, Jan. 6, 1997, abandoned.

[30] Foreign Application Priority Data

Jan. 26, 1996 [JP] Japan ................................. 8-11906
Jul. 24, 1996 [JP] Japan ................................. 8-194705

[51] Int. Cl.⁶ ........................... H04N 1/46; G03F 3/08; G06K 9/00
[52] U.S. Cl. .................... 358/530; 358/504; 358/518; 382/162
[58] Field of Search ................................ 358/406, 471, 358/474, 504, 505, 515, 518, 525, 530; 382/162, 167, 255; 355/235, 236; 250/208.1

[56] References Cited

U.S. PATENT DOCUMENTS

| | | | |
|---|---|---|---|
| 4,827,433 | 5/1989 | Kamon | 358/296 |
| 4,907,287 | 3/1990 | Homma et al. | 382/255 |
| 5,570,206 | 10/1996 | Yoshinaga | 358/474 |

FOREIGN PATENT DOCUMENTS

| | | | |
|---|---|---|---|
| 698994 | 2/1996 | European Pat. Off. | H04N 1/48 |
| 41 03 646 | 1/1992 | Germany . | |
| 63-287167 | 11/1988 | Japan . | |
| 1-97056 | 4/1989 | Japan . | |
| 5-110881 | 4/1993 | Japan . | |
| 5-284375 | 10/1993 | Japan . | |
| 6-22159 | 1/1994 | Japan . | |
| 6-297758 | 10/1994 | Japan . | |

OTHER PUBLICATIONS

Shunsuke Hattori, et al. "A Development of Image Scanner of High Resolution", (1$^{st}$ report; A Vibration Analysis by Digital Image Data), No. 940–10, Mar. 29–31, 1994, pp. 673–675.

*Primary Examiner*—Kim Yen Vu
*Assistant Examiner*—Kimberly A. Williams
*Attorney, Agent, or Firm*—Oblon, Spivak, McClelland, Maier & Neustadt, P.C.

[57] ABSTRACT

An image reading apparatus includes a reference pattern having slanting lines, which is provided outside a reading range and read by image sensors arranged at separate positions in a sub-scanning direction. A reference-position determining unit detects one of the slanting lines in the reference pattern based on image data output from one of the image sensors so that a position of the image data when one of the slanting lines is detected is determined as a reference position. First and second delay units have line memories which store image data read out from an original image having lines, the delay units delaying outputting of the image data from the line memories line by line. First and second determining units determine image data having color values at imaginary points. An error measurement unit selects one of the imaginary points whose image data has a minimum difference between the color values of the image data. First and second line correcting units output image data having the color values at a corrected position of each picture element by using an interpolation function, the interpolation function having a set of correction factors determined based on a distance between the selected imaginary point and the reference position.

17 Claims, 26 Drawing Sheets

|    | X1 | X2  | X3  | X4  | X5  | X6  | X7  | X8  | X9  |
|----|----|-----|-----|-----|-----|-----|-----|-----|-----|
| Y1 | 2  | 3   | 1   | 4   | 2   | 18  | 220 | 250 | 248 |
| Y2 | 2  | 1   | 2   | 3   | 13  | 216 | 248 | 250 | 252 |
| Y3 | 3  | 2   | 4   | 8   | 201 | 250 | 252 | 252 | 251 |
| Y4 | 2  | 3   | 4   | 183 | 251 | 254 | 252 | 249 | 32  |
| Y5 | 3  | 5   | 157 | 250 | 251 | 252 | 251 | 50  | 4   |
| Y6 | 2  | 130 | 249 | 250 | 251 | 250 | 62  | 5   | 3   |

FIG.16A

|    | X2 | X3 | X4 |
|----|----|----|----|
| Y1 | 3  | 1  | 4  |
| Y2 | 1  | 2  | 3  |
| Y3 | 2  | 4  | 8  |

FIG.16B

|    | X3 | X4 | X5  |
|----|----|----|-----|
| Y1 | 1  | 4  | 2   |
| Y2 | 2  | 3  | 13  |
| Y3 | 4  | 8  | 201 |

FIG.16C

|    | X4 | X5 | X6  |
|----|----|----|-----|
| Y1 | 4  | 2  | 18  |
| Y2 | 3  | 13 | 216 |
| Y3 | 8  | 201| 255 |

FIG.16D

|    | X5 | X6  | X7  |
|----|----|-----|-----|
| Y1 | 2  | 18  | 220 |
| Y2 | 13 | 216 | 248 |
| Y3 | 201| 250 | 252 |

FIG.16E

|    | X6  | X7  | X8  |
|----|-----|-----|-----|
| Y1 | 18  | 220 | 250 |
| Y2 | 216 | 248 | 250 |
| Y3 | 250 | 252 | 252 |

FIG.17A

| | X2 | X3 | X4 |
|---|---|---|---|
| Y1 | 0 | 0 | 0 |
| Y2 | 0 | 0 | 0 |
| Y3 | 0 | 0 | 0 |

FIG.17B

| | X3 | X4 | X5 |
|---|---|---|---|
| Y1 | 0 | 0 | 0 |
| Y2 | 0 | 0 | 0 |
| Y3 | 0 | 0 | 1 |

FIG.17C

| | X4 | X5 | X6 |
|---|---|---|---|
| Y1 | 0 | 0 | 0 |
| Y2 | 0 | 0 | 1 |
| Y3 | 0 | 1 | 1 |

FIG.17D

| | X5 | X6 | X7 |
|---|---|---|---|
| Y1 | 0 | 0 | 1 |
| Y2 | 0 | 1 | 1 |
| Y3 | 1 | 1 | 1 |

FIG.17E

| | X6 | X7 | X8 |
|---|---|---|---|
| Y1 | 0 | 1 | 1 |
| Y2 | 1 | 1 | 1 |
| Y3 | 1 | 1 | 1 |

|    | X0 | X1 | X2  | X3  | X4  | X5  | X6  | X7  | X8 | X9 |
|----|----|----|-----|-----|-----|-----|-----|-----|----|----|
| Y0 | 4  | 4  | 10  | 40  | 150 | 241 | 202 | 120 | 22 | 6  |
| Y1 | 4  | 6  | 42  | 148 | 240 | 200 | 122 | 20  | 10 | 4  |
| Y2 | 10 | 40 | 150 | 239 | 200 | 121 | 21  | 10  | 5  | 4  |

18 50 202 427 590 562 345 150 37 14

FIG.23A
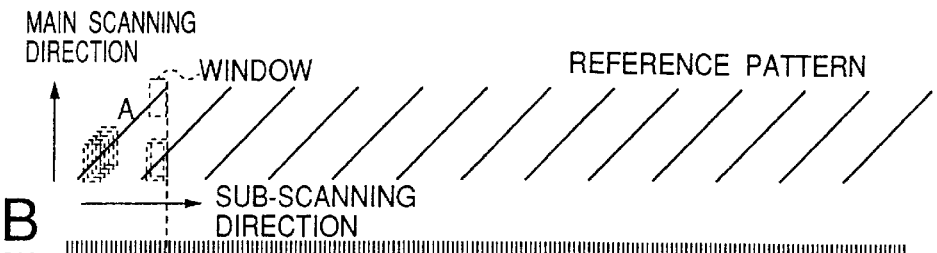
FIG.23B
CLOCK
FIG.23C
R
FIG.23D
G
FIG.23E
B
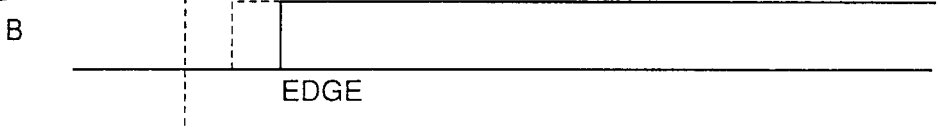
FIG.24
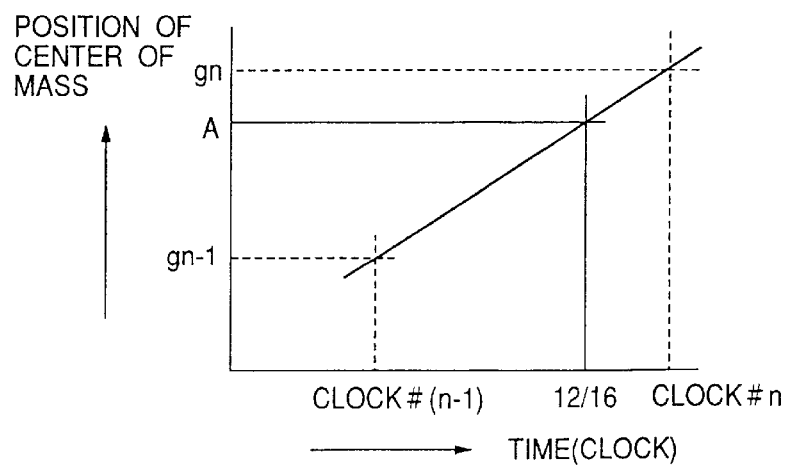

IMAGE READING APPARATUS FOR CORRECT POSITIONING OF COLOR COMPONENT VALUES OF EACH PICTURE ELEMENT

CROSS-REFERENCE TO RELATED APPLICATION

This is a continuation-in-part(CIP) of U.S. patent application Ser. No. 08/778,762, filed on Jan. 6, 1997 now abandoned.

BACKGROUND OF THE INVENTION (1) Field of the Invention

The present invention relates to an image reading apparatus in which image sensors are arranged in parallel to a main scanning direction and at separate positions in a sub-scanning direction to output color component values of each of picture elements of image data read from an original image.

(2) Description of the Related Art

An image reading apparatus in which R, G and B image sensors are arranged in parallel to a main scanning direction and at separate positions in a sub-scanning direction is known. The R, G and B image sensors read out image data from an original image and output color component values (RGB) of each of picture elements of the image data.

In the above image reading apparatus, the times the color component values (RGB) of each picture element are output by the image sensors are different due to the differences between the positions of the R, G and B image sensors in the sub-scanning direction. Therefore, the positions of the color component values of each picture element output by the image sensors may deviate from a desired position of the picture element, and a discrepancy of color in output image data may be produced.

To avoid this, in the above image reading apparatus, a correction of image data in which the difference between the positions of the R, G and B image sensors in the sub-scanning direction is taken into account is performed.

Suppose that an original image is optically read in the sub-scanning direction by the R, G and B image sensors in this order. Also, suppose that both a difference between the positions of the R image sensor and the G image sensor in the sub-scanning direction and a difference between the positions of the G image sensor and the B image sensor in the sub-scanning direction correspond to "N" lines in the original image.

For example, the above-mentioned correction of image data is performed such that, when the B image sensor reads out image data (B) from a present line, image data (G) read out from a corresponding preceding line by the G image sensor is delayed by the "N" lines, and image data (R) read out from a corresponding preceding line by the R image sensor is delayed by the "2N" lines. It is possible that the R, G and B image data of each picture element from the R, G and B image sensors be output at the same time.

However, the image reading apparatus generally has vibrations of the scanning mechanism such as a variation of the sub-scanning speed of the R, G and B image sensors. Due to the variation of the sub-scanning speed, positions of color component values of each picture element may deviate from a desired position of the picture element. Even if the correction of image data in which a difference between the positions of the image sensors in the sub-scanning direction is taken into account is performed, it is difficult to carry out a correction of the image data in which the variation of the sub-scanning speed of the R, G and B image sensors is taken into account. Since an image reading apparatus has vibrations of the scanning mechanism, the discrepancy of color in the output image data may be produced and the reproductivity of black may become low. It is impossible for the above image reading apparatus to prevent the positions of color component values of each picture element from deviating from the desired position of the picture element due to the variation of the sub-scanning speed.

SUMMARY OF THE INVENTION

An object of the present invention is to provide an improved image reading apparatus in which the above-described problems are eliminated.

Another object of the present invention is to provide an image reading apparatus which efficiently corrects the deviation between positions of color component values of each picture element of the read image data in the sub-scanning direction due to the variation of the sub-scanning speed of the image sensors, in order to ensure correct positioning of the color component values of each picture element.

Still another object of the present invention is to provide an image reading apparatus which precisely measures the deviation between positions of color component values of each picture element of the read image data in the sub-scanning direction with no need for a special device which measures the sub-scanning speed of the image sensors.

A further object of the present invention is to provide an image reading apparatus in which the measurement of the deviation between positions of color component values in the sub-scanning direction is carried out by using a simple measurement procedure.

The above-mentioned objects of the present invention are achieved by an image reading apparatus in which a set of image sensors for outputting color component values of each of picture elements by reading out image data from an original image are arranged in parallel to a main scanning direction and at separate positions in a sub-scanning direction, the color component values including a first color value, a second color value and a third color value, the image reading apparatus comprising: a reference pattern having slanting lines described in black on a white background, the reference pattern being provided outside a reading range and read by the image sensors; a reference-position determining unit which detects one of the slanting lines in the reference pattern based on image data having the third color value output by one of the image sensors so that a position of the image data when one of the slanting lines is detected is determined as a reference position; a first delay unit having a plurality of first line memories which store image data having the first color value read out from the original image having a plurality of lines, the first delay unit delaying outputting of the image data from the first line memories line by line; a first determining unit which determines image data having the first color value at first imaginary points based on the image data from the first delay unit; a second delay unit having a plurality of second line memories which store image data having the second color value read out from the original image having the plurality of lines, the second delay unit delaying outputting of the image data from the second lines memories line by line; a second determining unit which determines image data having the second color value at second imaginary points based on the image data from the second delay unit; an error measurement unit which selects one of the first imaginary points whose image data has a minimum difference between the first color value and the third color value of the image data at the reference position based on the image data determined by the first determining unit so that a first error is determined by the selected one of the first imaginary points, and which selects one of the second imaginary points whose image data has a minimum difference between the second color value and the third color value of the image data at the reference position based on the image data determined by the second determining unit so that a second error is determined by the selected one of the second imaginary points; a first line correcting unit which outputs image data having the first color value of each picture element at a corrected position based on the image data from the first delay unit by using a predetermined interpolation function, the interpolation function having a set of correction factors determined based on a distance between the first error and the reference position; and a second line correcting unit which outputs image data having the second color value of each picture element at a corrected position based on the image data from the second delay unit by using the interpolation function, the interpolation function having a set of correction factors determined based on a distance between the second error and the reference position.

It is possible that the image reading apparatus of the present invention effectively prevents the discrepancy of color in the output image data from being produced due to the variation of the sub-scanning speed. It is possible that the image reading apparatus of the present invention provides a better reproductivity of black even when the image reading apparatus has a variation of the sub-scanning speed of the image sensors.

Further, it is possible that the image reading apparatus of the present invention efficiently measures the deviation between positions of color component values of each picture element of the read image data in the sub-scanning direction. It is not necessary to use a special device which measures the sub-scanning speed of the image sensors. Further, in the image reading apparatus of the present invention, the measurement of the deviation between positions of color component values in the sub-scanning direction can be easily carried out by using a simple measurement procedure.

BRIEF DESCRIPTION OF THE DRAWINGS

Other objects, features and advantages of the present invention will become more apparent from the following detailed description when read in conjunction with the accompanying drawings in which:

FIGS. 16A through 16E are diagrams for explaining a pattern detection window which is applied to the image data pattern of FIG. 15;

FIGS. 17A through 17E are diagrams for explaining a pattern detection window which is applied to another image data pattern;

FIGS. 23A through 23E are time charts for explaining a procedure performed by the error measurement part of FIG. 12;

FIG. 24 is a diagram for explaining a procedure performed by the error measurement part of FIG. 12;

DETAILED DESCRIPTION OF THE PREFERRED EMBODIMENTS

A description will now be given of the preferred embodiments of the present invention with reference to the accompanying drawings.

Figure 1:
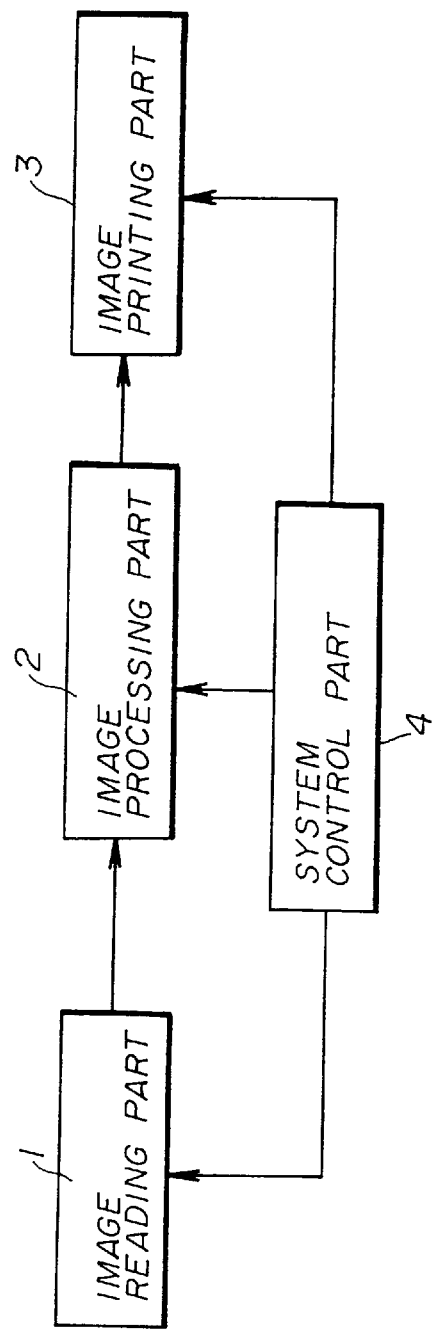
FIG. 1 is a block diagram showing the basic elements of a digital copier to which a first embodiment of the image reading apparatus of the present invention is applied.

FIG. 1 shows the basic elements of a digital copier to which a first embodiment of the image reading apparatus of the present invention is applied.

In the digital copier in FIG. 1, an image reading part 1 reads out image data from an original image and outputs color component values of each of picture elements of the image data. The color component values of each picture element include a red (R) value, a green (G) value, and a blue (B) value.

In the image reading part 1, R, G and B image sensors are arranged in parallel to a main scanning direction and at separate positions in a sub-scanning direction. The R, G and B image sensors respectively output the color component values (the R, G and B values) of each picture element from the original image.

An image processing part 2 processes the image data from the image reading part 1 and outputs the processed image data. An image recording part 3 records a color image on a recording medium based on the processed image data from the image processing part 2. For example, the image recording part 3 prints the color image on a copy sheet based on the processed image data. A system control part 4 controls the image reading part 1, the image processing part 2 and the image recording part 3 by supplying various control signals to the parts 1, 2 and 3.

In the digital copier in FIG. 1, the system control part 4 supplies a reference-pattern region signal S1 and a reading-end signal S2 to the image reading part 1, which will be described later.

Figure 2:
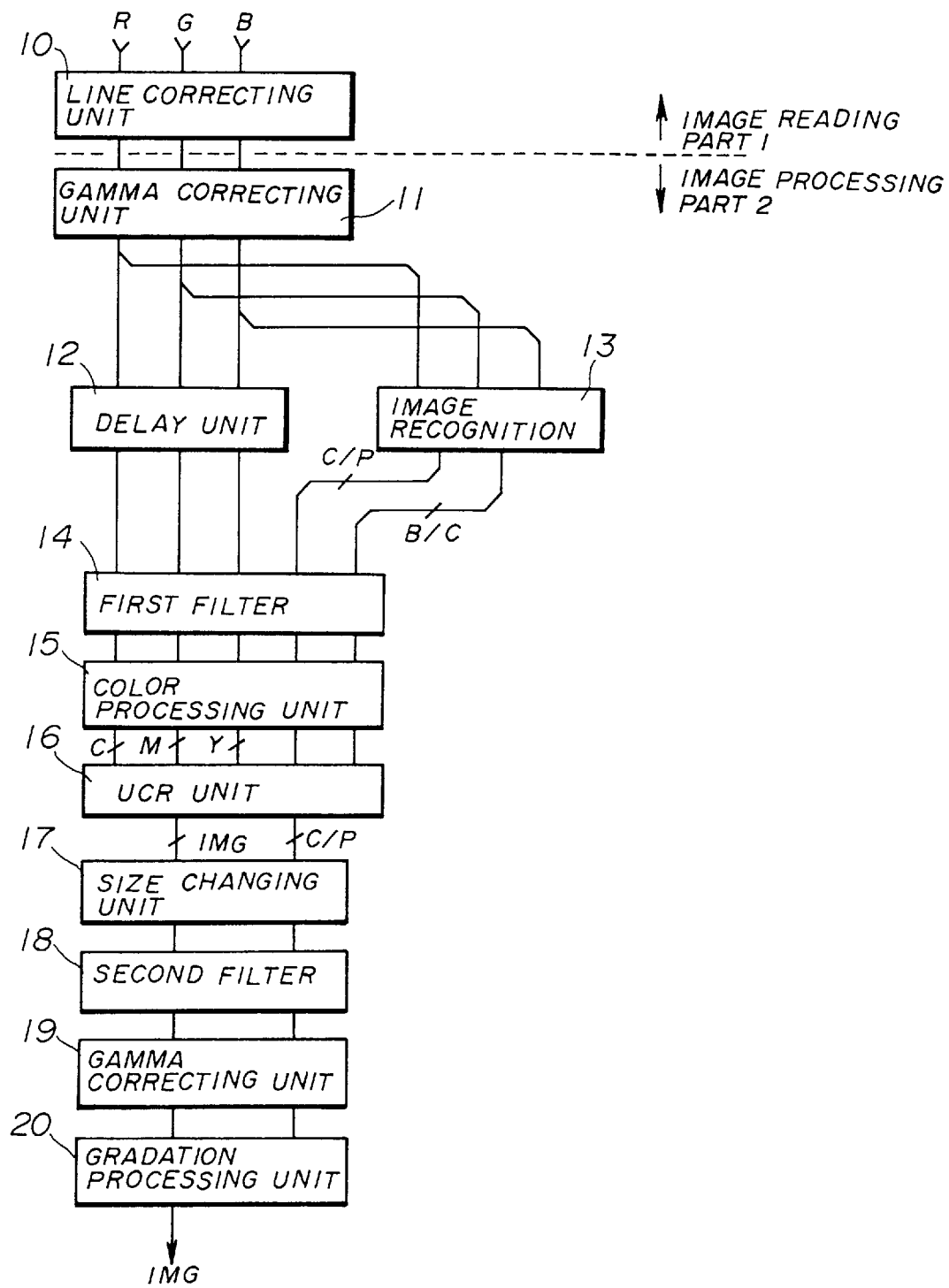
FIG. 2 is a block diagram for explaining the basic elements of an image reading part and an image processing part in the digital copier of FIG. 1.

FIG. 2 shows the basic elements of the image reading part 1 and the image processing part 2 in the digital copier in FIG. 1.

Referring to FIG. 2, a line correcting unit 10 in the image reading part 1 corrects a discrepancy between positions of color component values of picture elements in response to a variation of the sub-scanning speed of the R, G and B image sensors and a difference between the positions of the R, G and B image sensors. The line correcting unit 10 outputs the color component values (RGB) of each picture element in which the discrepancy is eliminated. The present embodiment of the image reading apparatus comprises the line correcting unit 10, which will be described later.

In the image processing part 2 in FIG. 2, a gamma correcting unit 11 corrects a gray balance of the color component values (RGB) of each picture element from the image reading part 1 and performs a conversion of color component values of the image data into optical densities. The gamma correcting unit 11 outputs the gamma-corrected image data (RGB) of each picture element to both a delay unit 12 and an image recognition unit 13.

The delay unit 12 delays the image data from the gamma correcting unit 11 such that the image data output from the delay unit 12 and output signals of the image recognition unit 13 are supplied to a first filter unit 14 at the same time for each picture element.

Figure 3:
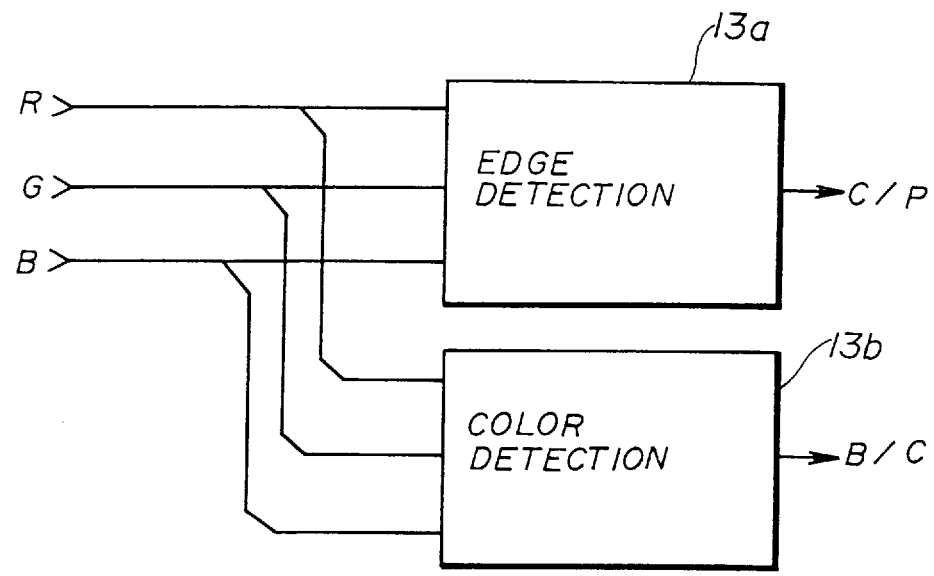
FIG. 3 is a block diagram showing an example of an image recognition unit of FIG. 2.

FIG. 3 shows an example of the image recognition unit 13 in FIG. 2. As shown in FIG. 3, the image recognition unit 13 includes an edge detection circuit 13a and a color detection circuit 13b.

In the image recognition unit 13 in FIG. 3, the edge detection circuit 13a outputs a text/graphic detection signal (C/P) from the gamma-corrected image data (RGB) from the gamma correcting unit 11. It is detected whether each picture element is in a text region of the original image or in a graphic region of the original image, and as a result of the detection, the C/P signal is output by the edge detection circuit 13a. When the C/P signal is set in high (H) state, it indicates that the picture element is in a text region of the original image. When the C/P signal is set in low (L) state, it indicates that the picture element is in a graphic region of the original image. In the edge detection, when the picture element is located at an edge of a character in the original image, the C/P signal is set in the high (H) state.

At the same time, the color detection circuit 13b outputs a chromatic/achromatic detection signal (B/C) from the gamma-corrected image data (RGB) from the gamma correcting unit 11. In the color detection circuit 13b, it is detected whether each picture element is in a chromatic region of the original image or in an achromatic region of the original image, and as a result of the detection the B/C signal is output by the color detection circuit 13b. When the B/C signal is set in high (H) state, it indicates that the picture element is in a chromatic region of the original image. When the B/C signal is set in low (L) state, it indicates that the picture element is in an achromatic region of the original image. In the color detection, a block of 4×4 picture elements is used for the color determination for one picture element.

The image recognition unit 13 is connected to various elements in a cascade connection. The various elements to which the image recognition unit 13 includes the first filter unit 14, a color processing unit 15, a UCR unit 16, a size changing unit 17, a second filter unit 18, a gamma correcting unit 19, and a gradation processing unit 20. The C/P signal from the image recognition unit 13 is supplied to each of these elements in synchronism with the image data supplied thereto. Also, the B/C signal from the image recognition unit 13 is supplied to each of the first filter unit 14, the color processing unit 15 and the UCR unit 16 in synchronism with the image data supplied thereto.

The above elements 14 through 20 carry out a text processing and a graphic processing based on the C/P signal and the B/C signal supplied from the image recognition unit 13. Further, the image recognition unit 13 determines whether the original image is a color image or a monochrome image, and controls a sequence and image processing based on the determination.

The first filter unit 14 is a filter of N×N picture elements which carries out an MTF (Modulation Transfer Function) correction of the image data (RGB) from the delay unit 12. When the C/P signal is set in the high (H) state (text), the first filter unit 14 performs an edge emphasizing process for the image data. When the C/P signal is set in the low (L) state (graphic), the first filter unit 14 performs a smoothing process for the image data.

The color processing unit 15 transforms the image data (RGB) from the first filter unit 14 into print color component values (including a Cyan value, a Magenta value and a Yellow value) of each picture element by using a masking method.

The UCR unit 16 performs a UCR (under-color removal) process for a common portion of the print color component values (CMY) of each picture element from the color processing unit 15 in order to improve the color reproduction quality of the image data. As a result of the UCR process, the UCR unit 16 generates a black (Bk) value of each picture element.

When the C/P signal is set in the low (L) state (graphic), the UCR unit 16 generates a Bk value indicating skeleton black for the picture element. When the C/P signal is set in the high (H) state (text), the UCR unit 16 generates a Bk value indicating full black for the picture element. When the C/P signal is set in the high (H) state (text) and the B/C signal is set in the high (H) state (achromatic), the print color component values (CMY) of the picture element are erased and a Bk value for the picture element is output by the UCR unit 16 so that a dot for the picture element is printed in black only.

The UCR unit 16 outputs an image signal ("IMG") indicating the print color component value (CMYBk) of each picture element to the size changing unit 17 after the UCR process. When the B/C signal is set in the low (L) state (chromatic), the scanning of the image reading part 1 for optically reading the original image is performed four times. When the B/C signal is set in the high (H) state (achromatic), the scanning of the image reading part 1 is performed once.

The size changing unit 17 carries out a size enlargement, size reduction or equal-size process for the image data with respect to the main scanning direction.

The second filter unit 18 is a filter of N×N picture elements which carries out a correction of the image data (CMYBk) from the size changing unit 17 based on the frequency characteristics of the image recording part 3 and the C/P signal supplied from the image recognition unit 13. When the C/P signal is set in the high (H) state (text), the second filter unit 18 performs an edge emphasizing process for the image data. When the C/P signal is set in the low (L) state (graphic), the second filter unit 18 performs a smoothing process for the image data.

The gamma correcting unit 19 corrects a gray balance of the print color component values (CMYBk) of each picture element from the second filter unit 18 based on the frequency characteristics of the image recording part 3 and the C/P signal from the image recognition unit 13. When the C/P signal is set in the high (H) state (text), a gamma correction in which great importance is attached to contrast is carried out. When the C/P signal is set in the low (L) state (graphic), a gamma correction in which great importance is attached to reproductivity is carried out.

The gradation processing unit 20 performs a dither processing for the gamma-corrected image data from the gamma correcting unit 19 based on the frequency characteristics of the image recording part 3 and the C/P signal from the image recognition unit 13. When the C/P signal is set in the high (H) state (text), a dither processing in which great importance is attached to resolution is carried out. When the C/P signal is set in the low (L) state (graphic), a dither processing in which great importance is attached to gradation is carried out.

Figure 4:
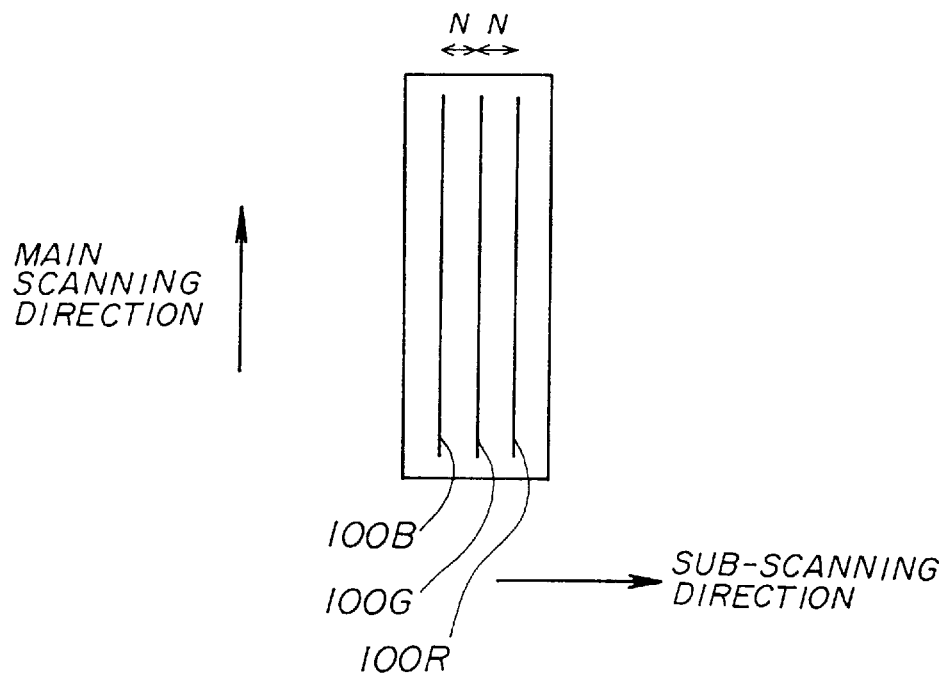
FIG. 4 is a diagram showing an example of R, G and B image sensors arranged in the image reading part of FIG. 1.

FIG. 4 shows an example of the R, G and B image sensors arranged in the digital copier of FIG. 1.

Referring to FIG. 4, an R image sensor 100R, a G image sensor 100G, and a B image sensor 100B are arranged in parallel to the main scanning direction and at separate positions in the sub-scanning direction.

Suppose that an original image is read in the sub-scanning direction by the R, G and B image sensors 100R, 100G and 100B in this order. Both a difference between the positions of the R image sensor and the G image sensor in the sub-scanning direction and a difference between the positions of the G image sensor and the B image sensor in the sub-scanning direction correspond to "N" lines in the original image. In the present embodiment, the positions of the R, G and B image sensors are equally spaced by the N lines in the sub-scanning direction.

Therefore, in the present embodiment, when the B image sensor 100B reads out image data from a present line in the original image, the G image sensor 100G reads out image data from a previous line preceding the present line in the original image by the "N" lines, and the R image sensor 100R reads out image data from another previous line preceding the present line in the original image by the "2N" lines.

Figure 5:
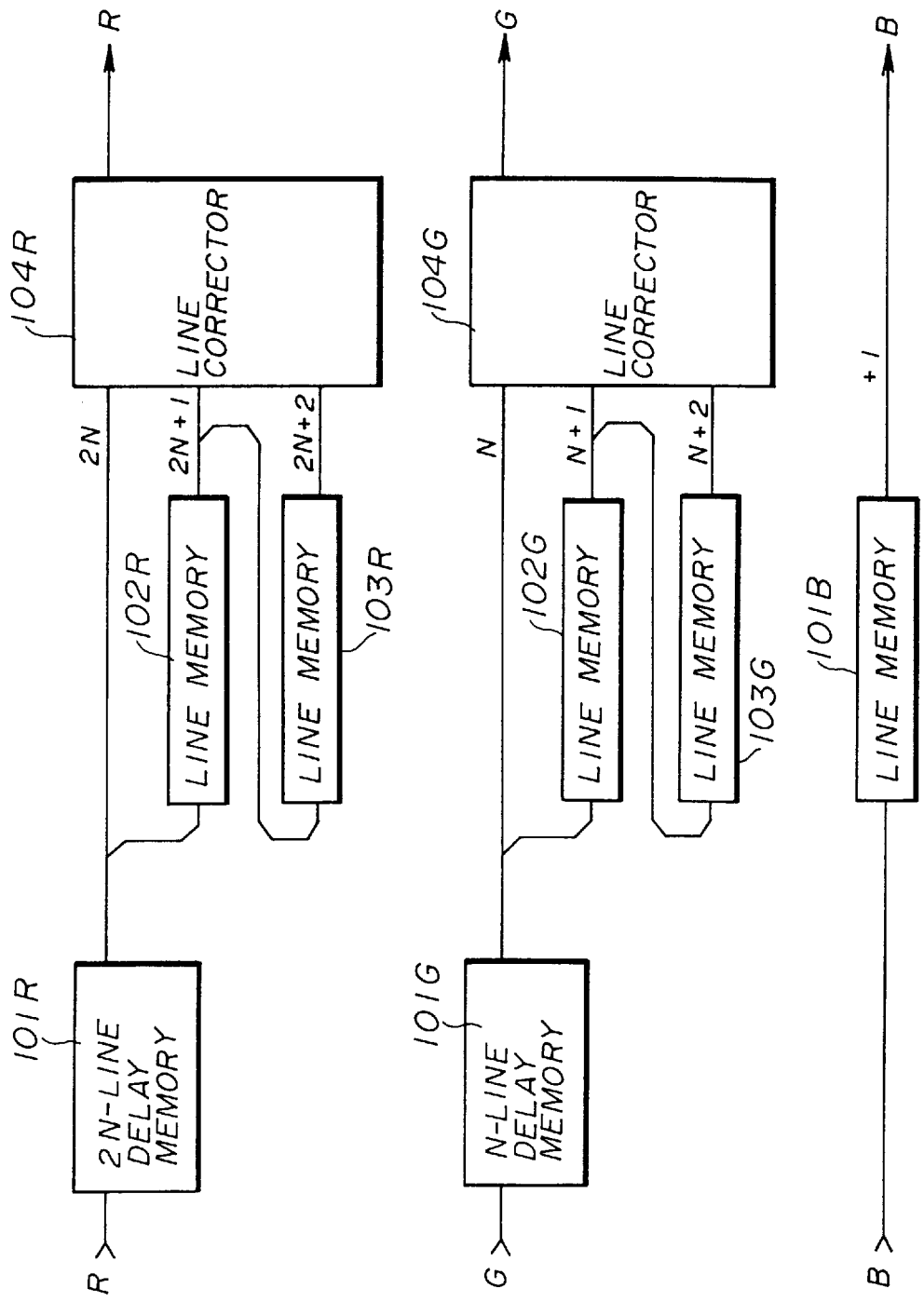
FIG. 5 is a block diagram for explaining an operation of a line correcting unit in the image reading apparatus of the present invention.

FIG. 5 is a block diagram for explaining an operation of a line correction unit in the image reading apparatus of the present invention. As described above, the line correcting unit 10 corrects the discrepancy between positions of color component values of picture elements in response to a variation of the sub-scanning speed of the R, G and B image sensors and a difference between the positions of the R, G and B image sensors. The line correcting unit 10 outputs the color component values (RGB) of each picture element in which the discrepancy between the positions of the color component values of the picture elements is eliminated.

As shown in FIG. 5, image data which is presently read from a present line in the original image by the B image sensor (hereinafter, this image data is called B image data) is stored in a line memory 101B. The outputting of the B image data from the line memory 101B is delayed by a time for one line. In the present embodiment, the position of the present line in the sub-scanning direction by the B image sensor 100B is used as a reference position upon which the position of any previous line in the sub-scanning direction by other image sensors (i.e., the G image sensor 100G and the R image sensor 100R) is based.

Image data read from the N-line preceding line by the G image sensor, image data read from the (N+1)-line preceding line by the G image sensor, and image data read from the (N+2)-line preceding line by the G image sensor (hereinafter, such image data is called the G image data) are respectively stored in a N-line delay memory 101G, a line memory 102G, and a line memory 103G. The outputting of the G image data of the N-line preceding line from the N-line delay memory 101G to a line corrector 104G is delayed by a time for the N lines. The outputting of the G image data of the (N+1)-line preceding line from the line memory 102G to the line corrector 104G is delayed by a time for the (N+1) lines. The outputting of the G image data of the (N+2)-line preceding line from the line memory 103G to the line corrector 104G is delayed by a time for the (N+2) lines.

Further, image data read from the (2N)-line preceding line by the R image sensor, image data read from the (2N+1)-line preceding line by the R image sensor, and image data read from the (2N+2)-line preceding line by the R image sensor (hereinafter, such image data is called the R image data) are respectively stored in a 2N-line delay memory 101R, a line memory 102R and a line memory 103R. The outputting of the R image data of the (2N)-line preceding line from the 2N-line delay memory 101R to a line corrector 104R is delayed by a time for the 2N lines. The outputting of the R image data of the (2N+l)-line preceding line from the line memory 102R to the line corrector 104R is delayed by a time for the (2N+1) lines. The outputting of the R image data of the (2N+2)-line preceding line from the line memory 103R to the line corrector 104R is delayed by a time for the (2N+2) lines.

The line corrector 104G corrects a deviation of the position of the color component value (G) for each of the picture elements of the (N+1)-line preceding line based on the G image data of the (N)-line preceding line, the (N+1)-line preceding line and the (N+2)-line preceding line by using interpolation. Similarly, the line corrector 104R corrects a deviation of the position of the color component value (R) for each of the picture elements of the (2N+1)-line preceding line based on the R image data of the (2N)-line preceding line, the (2N+1)-line preceding line and the (2N+2)-line preceding line by interpolation.

For each of the line corrector 104R and the line corrector 104G, a cubic-function-convolution process or a smoothing process may be used as the method of the interpolation for correction of positions of color component values. In the present embodiment, a cubic-function-convolution process is used which will be described later.

Accordingly, the image data from the B image sensor, the corrected image data from the line corrector 104G, and the corrected image data from the line corrector 104R are supplied from the image reading part 1 to the image processing part 2 at the same time.

Figure 6A:
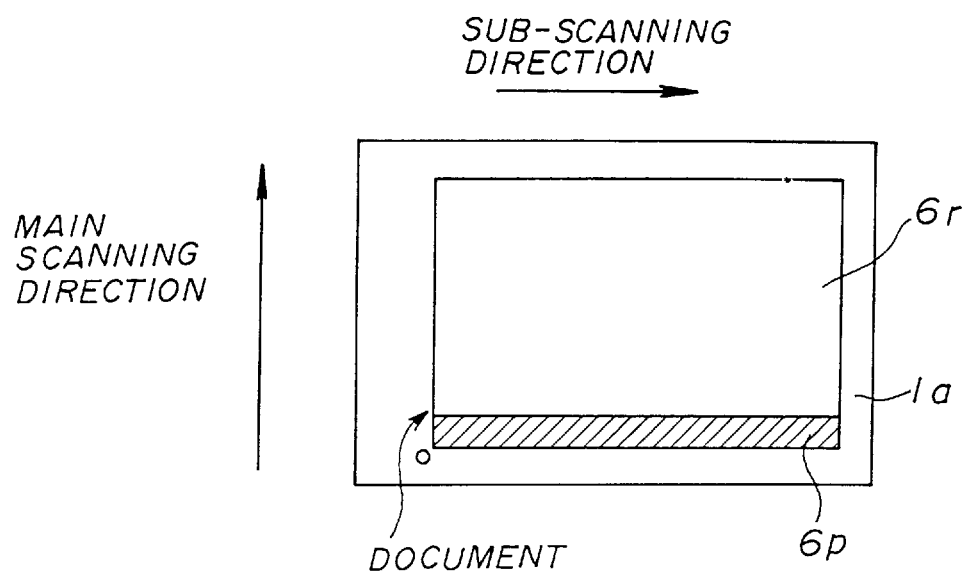
FIGS. 6A, 6B and 6C are diagrams for explaining a reference pattern read by the image sensors in the image reading apparatus.
Figure 6B:
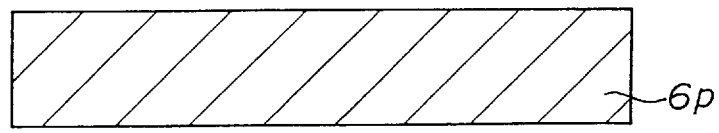
Figure 6C:
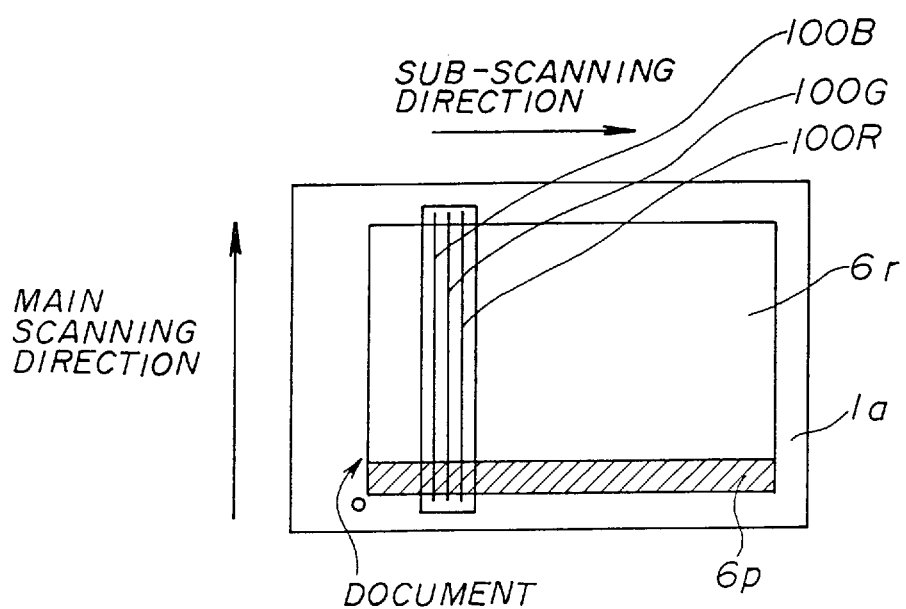

FIGS. 6A, 6B and 6C show an example of a reference pattern read by the image sensors in the image reading apparatus. This reference pattern is used to detect a deviation of the positions of color component values due to the variation of the sub-scanning speed of the R, G and B image sensors.

As shown in FIG. 6A, the image reading part 1 of the present embodiment includes a document setting base 1a on which a document with an original image is placed. The document setting base 1a includes a reading range 6r and a reference pattern 6p.

The scanning of the original image by the image reading part 1 in the main scanning direction and the sub-scanning direction is performed to output image data read from the original image within the reading range 6r. As shown in FIG. 6A, the reference pattern 6p is located on the document setting base 1a outside the reading range 6r and it is extending in parallel to the sub-scanning direction.

As shown in FIG. 6B, the reference pattern 6p has a plurality of slanting lines described in black on a white background. In the present embodiment, the slanting lines of the reference pattern 6p are at an angle of 45 degrees to both the main scanning direction and the sub-scanning direction, and they are equally spaced in the sub-scanning direction at intervals of a predetermined distance between two slanting lines. However, the angle of the slanting lines and the distance therebetween are not limited to those of the present embodiment, and modifications may be made in accordance with the basic concepts of the present invention.

As shown in FIG. 6C, in the image reading part 1 of the present embodiment, the reading of the reference pattern 6p by the image sensors 100B, 100G and 100R in the main scanning direction is first performed, and thereafter the reading of the original image by the image sensors 100B, 100G and 100R in the main scanning direction is performed.

Figure 7:
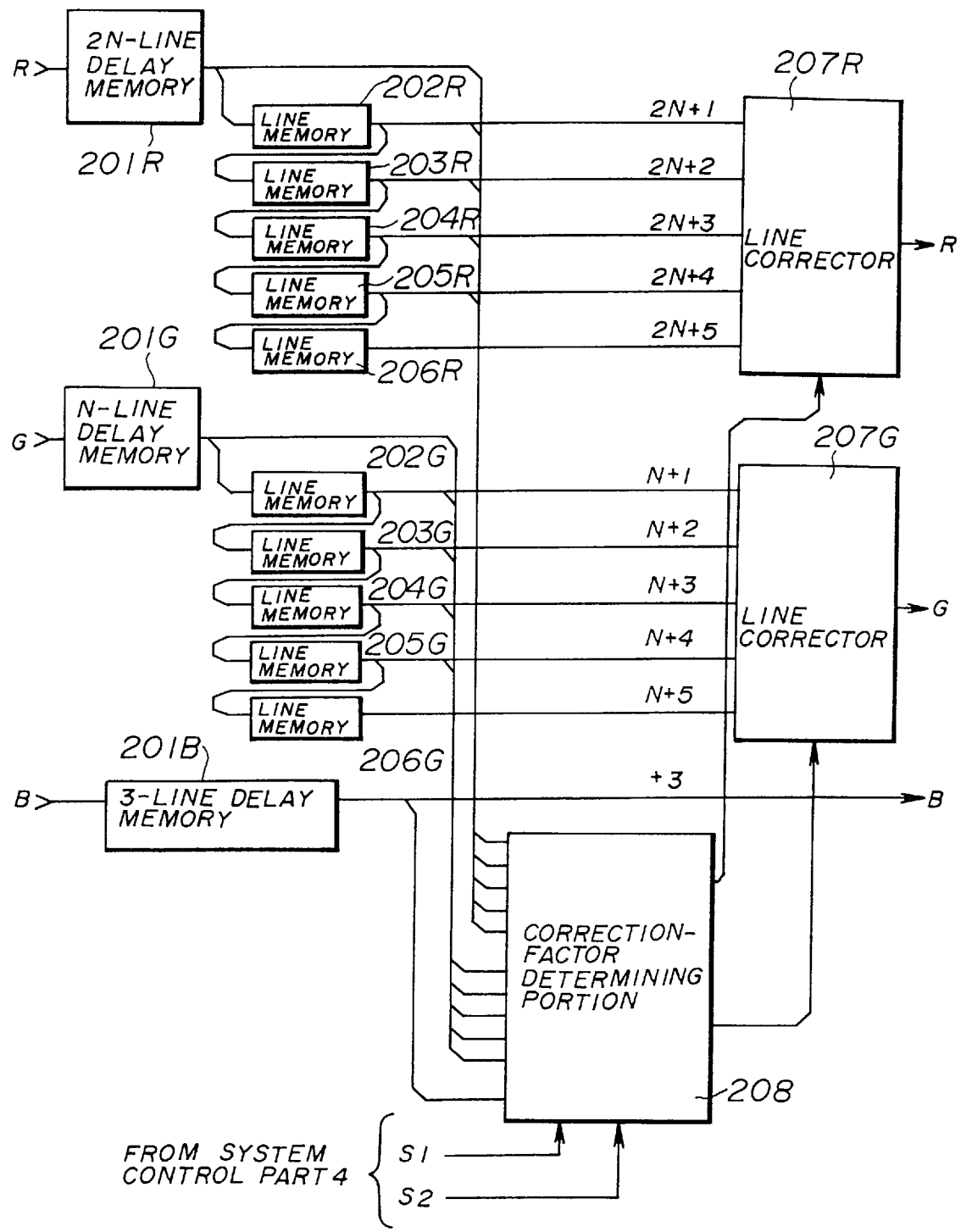
FIG. 7 is a block diagram showing an example of the line correcting unit of FIG. 2.

FIG. 7 shows an example of the line correcting unit 10 in FIG. 2. The basic elements of the line correcting unit 10 in FIG. 7 are similar to those of the line correcting unit in FIG. 5, but the number of line memories for delaying the outputting of image data to the line correctors is different and a correction-factor determining portion 208 is included in the line correction unit 10 in FIG. 7.

Referring to FIG. 7, the B image data which is presently read from a present line in the original image by the B image sensor 100B is stored in a 3-line delay memory 201B. The outputting of the B image data from the 3-line delay memory 210B is delayed by a time for the three lines. The B image data from the 3-line delay memory 210B is supplied to the image processing part 2 as well as the correction-factor determining portion 208.

In the present embodiment, the position of the present line in the sub-scanning direction by the B image sensor 100B is used as the reference position upon which the position of any previous line in the sub-scanning direction by the G image sensor 100G and the R image sensor 100R is based.

In the line correcting unit 10 in FIG. 7, the G image data read from the N-line preceding line by the G image sensor, the G image data read from the (N+1)-line preceding line by the G image sensor, the G image data read from the (N+2)-line preceding line by the G image sensor, the G image data read from the (N+3)-line preceding line by the G image sensor, the G image data read from the (N+4)-line preceding line by the G image sensor and the G image data read from the (N+5)-line preceding line by the G image sensor are stored in a N-line delay memory 201G, a line memory 202G, a line memory 203G, a line memory 204G, a line memory 205G and a line memory 206G, respectively.

The outputting of the G image data of the (N+1)-line preceding line through the (N+5)-line preceding line (from the line memories 202G–206G) to a line corrector 207G is delayed by a time for the (N+1) lines through a time for the (N+5) lines, respectively. At the same time, the outputting of the G image data of the (N)-line preceding line through the (N+4)-line preceding line (from the memories 201G–205G) to the correction-factor determining portion 208 is delayed by a time for the (N) lines through a time for the (N+4) lines, respectively.

Further, in the line correcting unit 10 in FIG. 7, the R image data read from the (2N)-line preceding line by the R image sensor, the R image data read from the (2N+1)-line preceding line by the R image sensor, the R image data read from the (2N+2)-line preceding line by the R image sensor, the R image data read from the (2N+3)-line preceding line by the R image sensor, the R image data read from the (2N+4)-line preceding line by the R image sensor and the R image data read from the (2N+5)-line preceding line by the R image sensor are stored in a 2N-line delay memory 201R, a line memory 202R, a line memory 203R, a line memory 204R and a line memory 205R, respectively.

The outputting of the R image data of the (2N+1)-line preceding line through the (2N+5)-line preceding line (from the line memories 202R–206R) to a line corrector 207R is delayed by a time for the (2N+1) lines through a time for the (2N+5) lines, respectively. At the same time, the outputting of the R image data of the (2N)-line preceding line through the (2N+4)-line preceding line (from the memories 201R–205R) to the correction-factor determining portion 208 is delayed by a time for the (N) lines through a time for the (N+4) lines, respectively.

The line corrector 207G corrects a deviation of the position of the color component value (G) for each of the picture elements of the (N+3)-line preceding line based on the G image data of the (N+1)-line preceding line through the (N+5)-line preceding line by using interpolation. Similarly, the line corrector 207R corrects a deviation of the position of the color component value (R) for each of the picture elements of the (2N+3)-line preceding line based on the R image data of the (2N+1)-line preceding line through the (2N+5)-line preceding line by using interpolation.

The correction-factor determining portion 208 determines a reference position for the line correctors 207G and 207R based on the B image data from the 3-line delay memory 201B.

In the present embodiment, when the B image data read from the reference pattern 6p by the B image sensor 100B considerably changes (from white to black at an edge of one slanting line in the reference pattern 6p) and indicates an optical density value above a threshold value, the position of the B image data for the edge of the slanting line is determined as the reference position for the line correction by the correction-factor determining portion 208.

In the present embodiment, when the reading of the reference pattern 6p by the B image sensor is started, the system control part 4 in FIG. 1 supplies the reference-pattern region signal "S1" to the correction-factor determining portion 208 as shown in FIG. 7. The reference-pattern region signal S1 is initially set in low state by the system control part4. When the edge of the slanting line in the reference pattern 6p is detected, the reference-pattern region signal S1 is set in high state and supplied to the correction-factor determining portion 208 by the system control part 4 as shown in FIG. 7.

Further, in the present embodiment, when the end of the reading range 6r on the document setting base 1a is detected by the B image sensor 100B during the reading of the original image, the system control part 4 in FIG. 1 supplies a reading-end signal S2 to the correction-factor determining portion 208 as shown in FIG. 7.

The correction-factor determining portion 208 outputs a set of corrector factors (used for the interpolation process which will be described later) to the line corrector 207G based on the G image data of the five lines from the memories 201G–205G and the reference-position detect signal S1 from the system control part 4. Similarly, the correction-factor determining portion 208 outputs the set of correction factors to the line corrector 207R based on the R image data of the five lines from the memories 201R–205R and the reference-position detect signal S1 from the system control part 4.

As described above, even when the image reading apparatus has a variation of the sub-scanning speed, the line corrector 207G corrects a deviation of the position of the color component value (G) for each of the picture elements of the (N+3)-line preceding line based on the G image data of the five previous lines from the memories 202G–206G by using the set of correction factors from the correction-factor determining portion 208. Similarly, the line corrector 207R corrects a deviation of the position of the color component value (R) for each of the picture elements of the (2N+3)-line preceding line based on the R image data of the five previous lines from the memories 202R–206R by using the set of correction factors from the correction-factor determining portion 208.

Figure 8:
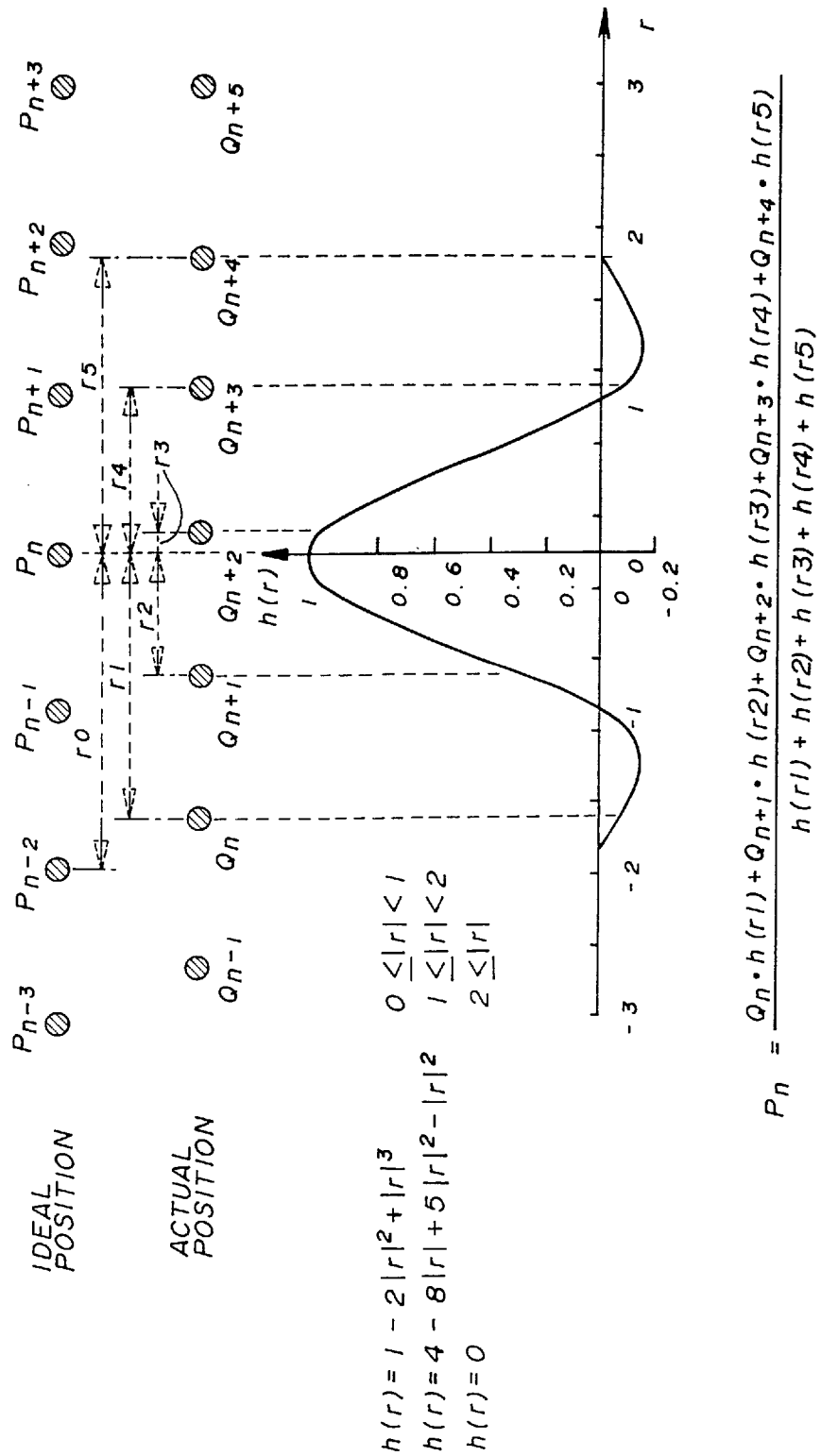
FIG. 8 is a diagram for explaining a cubic function convolution process used by the image reading apparatus to carry out an interpolation.

FIG. 8 shows a cubic function convolution process used by the line correctors 207G and 207R of the image reading apparatus in the present embodiment. In FIG. 8, the sub-scanning direction when reading the original image is indicated by the lateral axis of the coordinate system, and a discrepancy between color component values for each picture element is indicated by the longitudinal axis of the coordinate system.

As is apparent from the upper half of FIG. 8, ideal positions of picture elements when the image reading apparatus has no variation of the sub-scanning speed are indicated by a set of dots "Pn−3" through "Pn+3", and the ideal positions "Pn−3" through "Pn+3" are arrayed at equal intervals in the sub-scanning direction. Actual positions of the picture elements when the image reading apparatus has a variation of the sub-scanning speed are indicated by a set of dots "Qn−1" through "Qn+5" in FIG. 8. There is a deviation between the actual positions "Qn−1" through "Qn+5" in the sub-scanning direction.

As shown on the lower half of FIG. 8, an interpolation function h(r) is defined according to a distance "r" between the ideal position and the actual position with respect to each of the actual nearby positions as follows.

$$h(r) = 1 - 2|r|^2 + |r|^3 \quad \text{when } 0 \leq |r| < 1$$

$$h(r) = 4 - 8|r| + 5|r|^2 - |r|^3 \quad \text{when } 1 \leq |r| < 2$$

$$h(r) = 0 \quad \text{when } 2 \leq |r|$$

The actual nearby positions of the picture elements "Qn", "Qn+1", "Qn+2", "Qn+3" and "Qn+4" are selected with respect to the ideal position "Pn" as the sampling points. In the above example on the upper half of FIG. 8, the sampling points are located within a range of the distance "r0" of two dots distant from the position "Pn". That is, the distances "r1", "r2", "r3", "r4" and "r5" of the sampling points from the position "Pn" are smaller than the distance "r0" of the position "Pn−2" from the position "Pn".

By applying the above example to the cubic-function-convolution process, the interpolation function h(r) is defined according to the distance "r" of each of the sampling points "Qn", "Qn+1", "Qn+2", "Qn+3" and "Qn+4" from the reference position "Pn". The thus obtained interpolation function h(r) provides a set of correction factors for the picture elements of the sampling points, and the values of the interpolation function are represented by h(r1), h(r2), h(r3), h(r4) and h(r5).

Therefore, by using the cubic-function-convolution process, each of the line correctors 207G and 207R outputs the color component value (Pn) of each picture element at the ideal position based on the image data (Qn through Qn+4) of the sampling points and the set of correction factors as follows.

$$Pn = \{Qn \cdot h(r1) + Qn+1 \cdot h(r2) + Qn+2 \cdot h(r3) + Qn+3 \cdot h(r4) + Qn+4 \cdot h(r5)\}/\{h(r1) + h(r2) + h(r3) + h(r4) + h(r5)\}$$

As is apparent from the above equation, the set of correction factors in the above example are represented by {h(r1)/M, h(r2)/M, h(r3)/M, h(r4)/M, h(r5)/M} where M indicates the sum of h(r1), h(r2), h(r3), h(r4) and h(r5). Therefore, generally, the total sum of the set of correction factors is equal to 1.

Since the set of correction factors for each picture element is supplied from the correction-factor determining portion 208 to the line corrector 207G, the line corrector 207G outputs the color component value (G) at the corrected position for each of the picture elements of the (N+3)-line preceding line based on the G image data of the five lines (including the (N+1)-line preceding line through the (N+5)-line preceding line) from the memories 202G–206G by using the set of correction factors. Similarly, since the set of correction factors for each picture element is supplied from the correction-factor determining portion 208 to the line corrector 207R, the line corrector 207R outputs the color component value (R) at the corrected position for each of the picture elements of the (2N+3)-line preceding line based on the R image data of the five lines (including the (2N+1)-line preceding line through the (2N+5)-line preceding line) from the memories 202R–206R by using the set of correction factors.

Figure 9:
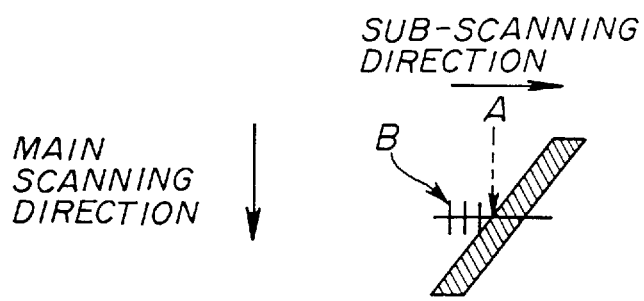
FIG. 9 is a diagram for explaining an operation of a correction-factor determining portion of the line correcting unit of FIG. 7.

FIG. 9 shows an operation of the correction-factor determining portion 208 of the line correcting unit 10 in FIG. 7.

As indicated by an arrow "A" in FIG. 9, the correction-factor determining portion 208 determines the position of the B image data for the edge of one slanting line in the reference pattern 6p as the reference position for the line correction when the reference-pattern range signal S1 in the high state from the system control part 4 is received.

When the reference position is determined, the correction-factor determining portion 208 determines color component values (for each of the R image data and the G image data) at a plurality of imaginary points whose locations are predetermined with respect to the reference position, based on the R image data of the sampling points and the G image data of the sampling points by using interpolation.

In the present embodiment, eight imaginary points between two sampling points are predetermined with respect to the reference position, and a distance between two of the eight imaginary points in the sub-scanning direction is preset to ⅛ of a dot pitch which is equal to the distance between two dots. Therefore, in the present embodiment, the eight imaginary points are located at equal intervals of ⅛ of the dot pitch in the sub-scanning direction with respect to the reference position, and the color component values (for each of the R image data and the G image data) at the imaginary points are determined based on the R image data of the sampling points and the G image data of the sampling points by using interpolation.

Further, as indicated by an arrow B in FIG. 9, the correction-factor determining portion 206 selects one of the imaginary points (R) having a minimum difference between the color component value (R) and the color component value (B) based on the color component values (R) of the imaginary points, and selects one of the imaginary points (G) having a minimum difference between the color component value (G) and the color component value (B) based on the color component values (G) of the eight imaginary points. Thus, the correction-factor determining portion 206 determines a distance of the selected imaginary point (R) from the reference position (B) and a distance of the selected imaginary point (G) from the reference position (B).

Since a deviation of the position of the color component value (R) and a deviation of the position of the color component value (G) due to the variation of the sub-scanning speed are determined by the above distance of the selected imaginary point (R) and the above distance of the selected imaginary point (G), the line correctors 207R and 207G output the corrected positions of the color component values (R, G) by using the set of correction factors for the interpolation function determined based on the above distances.

Figure 10A:
FIGS. 10A and 10B are diagrams for explaining a timing of determination of a reference position by the correction-factor determining portion.
Figure 10B:
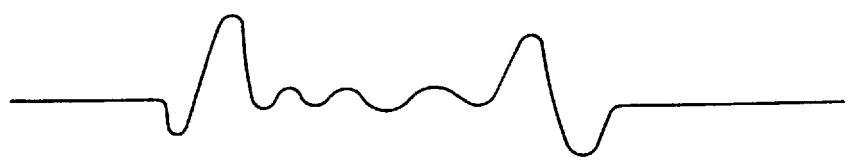

FIGS. 10A and 10B are diagrams for explaining a timing of the determination of the reference position performed by the correction-factor determining portion 208 in FIG. 7.

In the above-described embodiment, the correction-factor determining portion 208 uses a change (or a change from white to black) of the optical density of image data when the reading of the reference pattern 6p is performed, the change of the optical density of the image data being shown in FIG. 10A. When the optical density value of the image data is above the threshold value (at the edge of the slanting line), the correction-factor determining portion 208 determines the position of the image data at the edge of the slanting line as the reference position for the line correction.

Alternatively, a rate of change of the optical density of image data when reading the edge of the slanting line in the reference pattern 6p, as shown in FIG. 10B, may be used by the correction-factor determining portion 208. In such a case, when the rate of change of the optical density of the image data is above a reference rate value, the correction-factor determining portion 208 determines the position of the image data for the edge of the slanting line as the reference position for the line correction.

When the image reading apparatus in the present embodiment is applied to the digital copier, it is not necessary that images of the slanting lines in the reference pattern 6p be printed on a copy sheet. However, when the image reading apparatus in the present embodiment is applied to an image forming system in which image data of an original image is output to an external device, image data of the slanting lines in the reference pattern 6p and the digital image data of the original image may be output in order to carry out the line correction for correcting a very small deviation between the positions of color component values of the picture elements due to the variation of the sub-scanning speed.

In the above-described embodiment, when the minimum value of the difference between the R, G and B image data of the selected point is greater than an allowable maximum value, it is desirable to provide a notification of the failure condition relating to the line correction for the operator on the digital copier.

Figure 11:
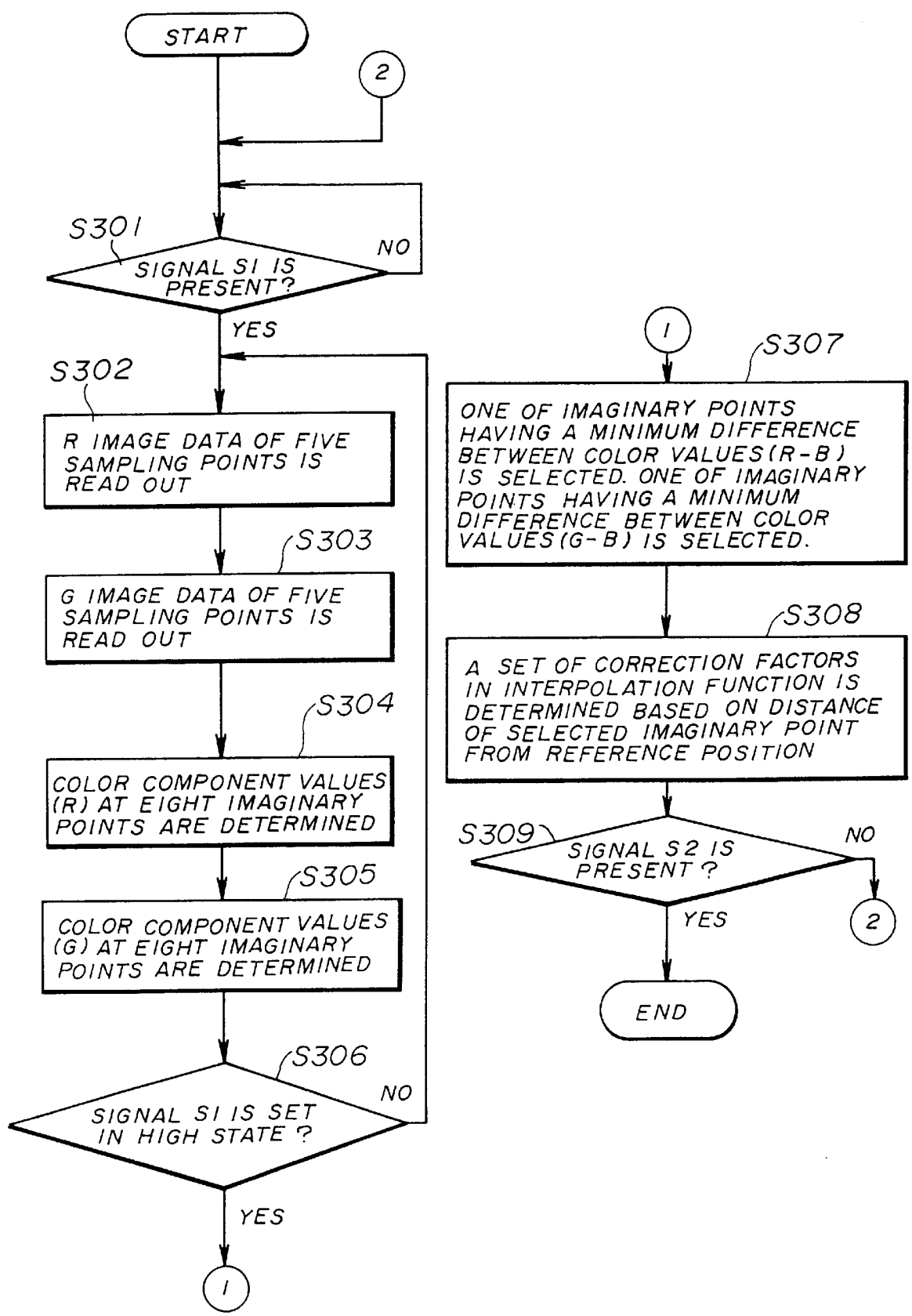
FIG. 11 is a flowchart for explaining a procedure performed by the correction-factor determining portion of FIG. 7.

FIG. 11 shows a correction-factor determining procedure performed by the correction-factor determining portion 208 in FIG. 7.

Referring to FIG. 11, the correction-factor determining portion 208 at step S301 detects whether the reference-pattern region signal "S1" from the system control part 4 is present at the correction-factor determining portion 208. The reference-pattern signal S1 is initially set in low state by the system control part 4.

When the result at the step S301 is affirmative, step S302 is performed. Otherwise the above step S301 is repeated.

Step S302 reads out the R image data of the five sampling points (corresponding to the (2N)-line preceding line through the (2N+4)-line preceding line) from the memories 201R–205R. Step S303 reads out the G image data of the five sampling points (corresponding to the (N)-line preceding line through the (N+4)-line preceding line) from the memories 201G–205G.

After the step S303 is performed, step S304 determines color component values (R) at the eight imaginary points by using interpolation based on the R image data at the step S302. Step S305 determines color component values (G) at the eight imaginary points by using interpolation based on the G image data read out at the step S303.

After the step S305 is performed, step S306 detects whether the reference-pattern region signal "S1" which is set in the high state is present at the correction-factor determining portion 208.

When the result at the step S306 is affirmative, the position of the B image data at the edge of the slanting line is determined as the reference position for the line correction, and step S307 is performed. Otherwise the above steps S302–S305 are repeated.

Step S307 selects one of the imaginary points (R) having a minimum difference between the color component value (R) and the B image data value based on the color component values (R) of the imaginary points, and selects one of the imaginary points (G) having a minimum difference between the color component value (G) and the B image data value based on the color component values (G) of the eight imaginary points.

Further, step S307 determines a distance of the selected imaginary point (R) from the reference position and a distance of the selected imaginary point (G) from the reference position.

After the step S307 is performed, step S308 determines a set of correction factors (R) for the interpolation function based on the distance of the selected imaginary point (R) at the step S307, and determines a set of correction factors (G) for the interpolation function based on the distance of the selected imaginary point (G).

Further, step S308 outputs the set of correction factors (R) from the correction-factor determining portion 208 to the line corrector 207R, and outputs the set of correction factors (G) from the correction-factor determining portion 208 to the line corrector 207G.

After the step S308 is performed, step S309 detects whether the reading-end signal "S2" supplied from the system control part 4 is present at the correction-factor determining portion 208.

When the result at the step S309 is affirmative, the correction factor determining procedure in FIG. 11 ends. Otherwise the above steps S301–S308 are repeated.

Since the image reading apparatus of the present embodiment includes the correction-factor determining portion 208 and the line correctors 207R and 207G described above, it is possible to effectively prevent a discrepancy of color in the output image data from being produced due to the variation of the sub-scanning speed. It is also possible for the image reading apparatus of the present embodiment to provide a better reproductivity of black even when there is the variation of the sub-scanning speed.

Figure 12:
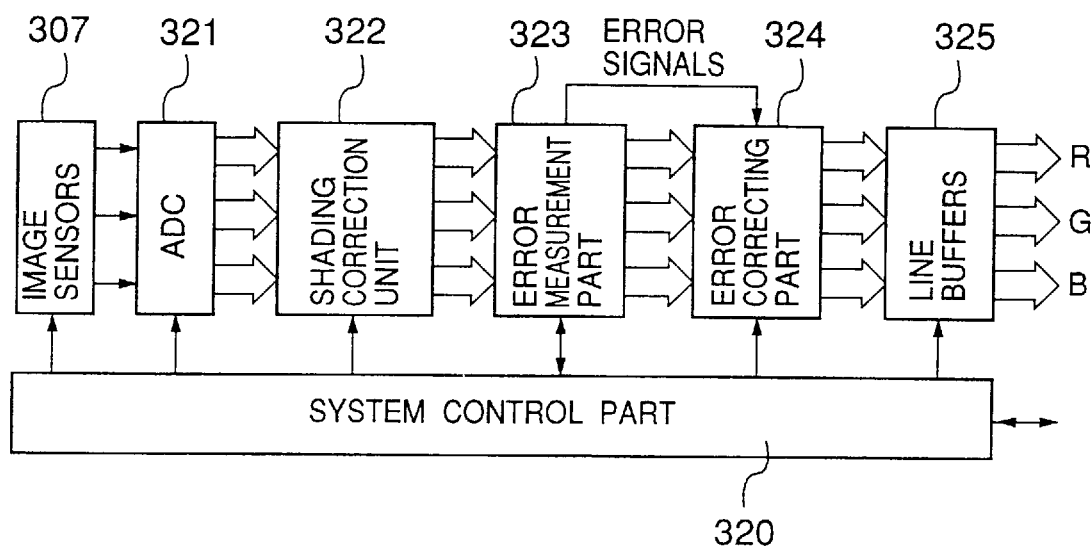
FIG. 12 is a block diagram for explaining the basic elements of a second embodiment of the image reading apparatus of the present invention.

Next, FIG. 12 shows the basic elements of a second embodiment of the image reading apparatus of the present invention.

In the present embodiment of the image reading apparatus, a reference pattern (not shown in FIG. 12) which is the same as the reference pattern of FIGS. 6A, 6B and 6C is arranged in the document setting base 1a. The reference pattern has slanting lines which are described in black on a white background. The slanting lines of the reference pattern are at an angle of 45 degrees to both the main scanning direction and the sub-scanning direction. The slanting lines are equally spaced in the sub-scanning direction at intervals of a predetermined distance between two slanting lines.

This reference pattern is read out by the R, G and B image sensors in the present embodiment of the image reading apparatus. The read image data of the reference pattern is used to detect a deviation of the positions of color component values due to the variation of the sub-scanning speed of the R, G and B image sensors.

In the present embodiment, R, G and B image sensors 307 (which will be called the image sensors 307) are arranged in parallel to the main scanning direction and at separate positions in the sub-scanning direction. The image sensors 307 are similar to the image sensors 100 of FIG. 4. The image sensors 307 respectively output signals which indicate the color component values (R, G and B values) of each picture element from the original image. The output signals of the image sensors 307 are supplied to an analog-to-digital converter (ADC) 321.

The ADC 321 converts the output signals of the image sensors 307 into digital signals, each digital signal indicating a value of multiple-level image data for one of the color component values (the R, G and B values). The output signals of the ADC 321 are supplied to a shading correction unit 322.

The shading correction unit 322 performs a shading correction of the output signals of the ADC 321 by comparing an optical density of each of the output signals with a reference optical density. The shading correction unit 322 outputs the shading-corrected image signals to an error measurement part 323. The shading-corrected image signals at the output of the shading correction unit 322 are called the read image data.

The error measurement part 323 performs an error measurement based on the read image data from the shading correction unit 322, which will be described later. The error measurement part 323 outputs error signals as the result of the error measurement and the read image data to an error correcting part 324.

Based on the error signals from the error measurement part 323, the error correcting part 324 corrects the errors of the positions of the color component values of each picture element. The error correcting part 324 outputs the color component values of each picture element in which the errors are eliminated. The error-corrected image signals from the error correcting part 324 are supplied to line buffers 325. The error-corrected image signals (the color component values R, G and B) stored in the line buffers 325 are output.

A system control part 320 controls the image sensors 307, the ADC 321, the shading correction unit 322, the error measurement part 323, the error correcting part 324, and the line buffers 325. The system control part 320 performs a timing control and operational condition setting of these elements. The system control part 320 outputs a control signal to each of the image sensors 307, the ADC 321, the shading correction unit 322, the error measurement part 323, the error correcting part 324, and the line buffers 325. The error-corrected image signals (the color component values R, G and B) are output by the line buffers 325 in synchronism with the control signal output from the system control part 320.

Similarly to the embodiment of FIGS. 2 through 11, the error measurement part 323 of this embodiment comprises a reference-position determining unit, a first delay unit, a first determining unit, a second delay unit, a second determining unit, and an error measurement unit.

The reference-position determining unit detects one of the slanting lines in the reference pattern based on image data having the third color value (for example, the color component value B) output by one of the image sensors 307 so that a position of the read image data when one of the slanting lines is detected is determined as a reference position.

The first delay unit has first line memories which store the image data having the first color value (for example, the color component value R) read out from the original image having a plurality of lines, the first delay unit delaying outputting of the image data from the first line memories line by line. The first determining unit determines image data having the first color value at first imaginary points based on the image data from the first delay unit.

The second delay unit has second line memories which store image data having the second color value (for example, the color component value G) read out from the original image having the plurality of lines, the second delay unit delaying outputting of the image data from the second lines memories line by line. The second determining unit determines image data having the second color value at second imaginary points based on the image data from the second delay unit.

The error measurement unit selects one of the first imaginary points whose image data has a minimum difference between the first color value and the third color value of the image data at the reference position based on the image data determined by the first determining unit so that a first error is determined by the selected one of the first imaginary points. The error measurement unit selects one of the second imaginary points whose image data has a minimum difference between the second color value and the third color value of the image data at the reference position based on the image data determined by the second determining unit so that a second error is determined by the selected one of the second imaginary points.

In the present embodiment, the error measurement part 323 outputs the error signals to the error correcting part 324, one of the error signals indicating the first error and the other error signal indicating the second error.

Similarly to the embodiment of FIGS. 2 through 11, the error correcting part 324 of this embodiment comprises a first line correcting unit and a second line correcting unit.

The first line correcting unit outputs image data having the first color value of each picture element at a corrected position based on the image data from the first delay unit by using a predetermined interpolation function, the interpolation function having a set of correction factors determined based on a distance between the first error and the reference position. The second line correcting unit outputs image data having the second color value of each picture element at a corrected position based on the image data from the second delay unit by using the interpolation function, the interpolation function having a set of correction factors determined based on a distance between the second error and the reference position.

In the present embodiment, the error measurement part 323 determines a position of the center of mass of a window in the main scanning direction, the window being set in a bit map pattern of image data read by one of the image sensors 307. The error measurement part 323 measures an error of the position of the read image data based on a displacement of the center of mass of a window in the main scanning direction when the window is shifted and based on a quantity of the shifting of the window in the main scanning direction. The quantity of the shifting is determined with respect to a line clock signal on which a time of start of a sub-scanning by the image sensors 307 is based.

In the present embodiment, the reference-position determining unit sets a window in the image data of a leading one of the slanting lines of the reference pattern, determines a position of the center of mass of the window in the main scanning direction, and determines the position of the center of mass of the window as the reference position.

Figure 13:
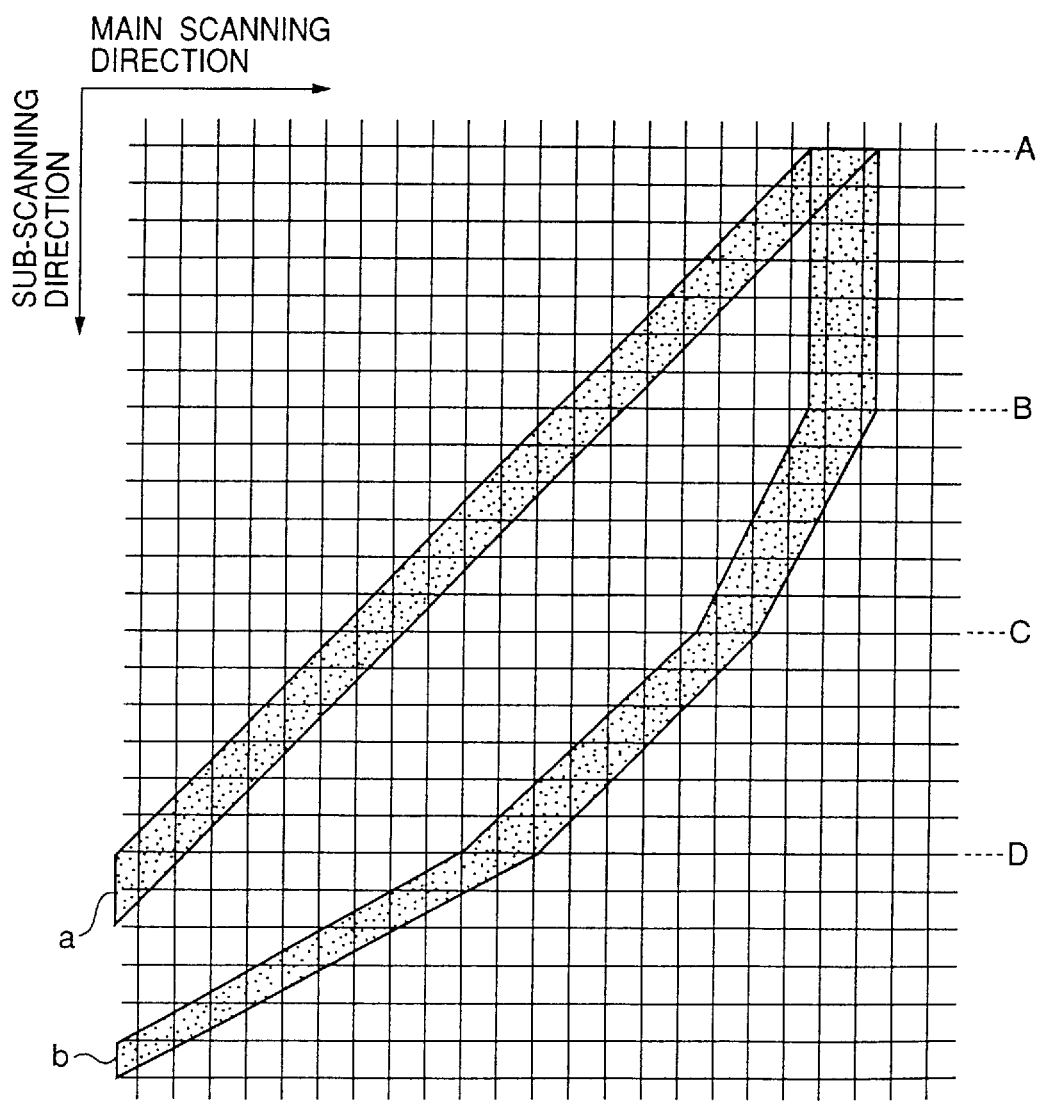
FIG. 13 is a diagram for explaining a bit map pattern of the read image data of the reference pattern read out by the image sensors in the image reading apparatus of FIG. 12.

FIG. 13 shows a bit map pattern of the read image data of the reference pattern from the image sensors 307 of FIG. 12.

A measurement of errors of the positions of the read image data of the reference pattern is performed by the error measurement part 323 by using the bit map pattern of FIG. 13. A description of the measurement of the errors used by the image reading apparatus of this embodiment will be given in the following.

In FIG. 13, the main scanning direction indicates the order in which the reference pattern is read by the image sensors 307 and values of picture elements of the read image data are output by the image sensors 307 according to the lapse of time. The sub-scanning direction indicates the direction in which the image sensors 307 are moved relative to the reference pattern each time the reading of one line in the main scanning direction is finished.

In FIG. 13, rectangular areas which are formed by parallel lines in the main scanning direction and parallel lines in the sub-scanning direction indicate picture elements. When the picture elements in the main scanning direction and in the sub-scanning direction are the same in size, the rectangular areas are squares. The matrix of picture elements of FIG. 13 corresponds to the original image of the reference pattern. The arrangement of the picture elements in both the main scanning direction and the sub-scanning direction depends on the lapse of time. However, if the read image data is stored in a memory, each of the picture elements can be accessed regardless of the lapse of time.

In FIG. 13, "a" indicates a bit map pattern of image data of a 45° slanting line of the reference pattern when there is no variation of the sub-scanning speed of the image sensors 307. As shown, the angle of the bit map pattern "a" to the sub-scanning direction is the same as 45°, that is, the angle of the slanting line of the original image to the sub-scanning direction.

In FIG. 13, "b" indicates various bit map patterns of image data of the slanting line of the reference pattern in cases in which there is a variation of the sub-scanning speed of the image sensors 307. The bit map pattern "b" in a range between "A" and "B" is indicated by image data of the slanting line when the sub-scanning speed is set at zero. In this case, the bit map pattern "b" becomes a line parallel to the sub-scanning direction. The bit map pattern "b" in a range between "B" and "C" is indicated by image data of the slanting line when the sub-scanning speed is set at ½ times a given reference speed. In this case, the angle of the bit map pattern "b" to the sub-scanning direction is about 26.57° (tan $\theta$=0.5 where $\theta$ is the angle in this case). The bit map pattern "b" in a range between "C" and "D" is indicated by image data of the slanting line when the sub-scanning speed is equal to the given reference speed. In this case, the angle of the bit map pattern "b" to the sub-scanning direction is about 45°, that is the same as the angle of the bit map pattern "a". The bit map pattern "b" in a range beyond "D" is indicated by image data of the slanting line when the sub-scanning speed is set at 1.5 times the given reference speed. In this case, the angle of the bit map pattern "b" to the sub-scanning direction is about 56.31°.

Accordingly, it is possible to measure errors of the positions of the read image data of the reference pattern based on the principle that the angle (or the gradient) of the bit map pattern of the read image data of the slanting line of the reference pattern with respect to the sub-scanning direction is a function of the sub-scanning speed of the image sensors 307. That is, if there is a variation of the sub-scanning speed of the image sensors 307, the angle of the bit map pattern to the sub-scanning direction varies from the original angle (for example, 45°) of the slanting line of the reference pattern.

In the bit map pattern of FIG. 13, the picture elements in the bit map pattern are indicated by squares, and the resolution of the main scanning direction and the resolution of the sub-scanning direction are the same. However, the measurement of errors of the positions of the read image data using the bit map pattern of FIG. 13 may be performed in a case in which the resolution of the main scanning direction and the resolution of the sub-scanning direction are different from each other. For example, it is applicable to a case in which the resolution of the main scanning direction is 400 dpi (dots per inch) and the resolution of the sub-scanning direction is 600 dpi.

Further, the measurement of errors of the positions of the read image data using the bit map pattern of FIG. 13 may be performed when the reference pattern has slanting lines at a different angle to the sub-scanning direction. In such a case, it can be assumed that the variation of the sub-scanning speed of the image sensors 307 is a function of the angle (or the gradient) of the bit map pattern of the read image data of the slanting line of the reference pattern with respect to the sub-scanning direction.

Figures 14, 15:
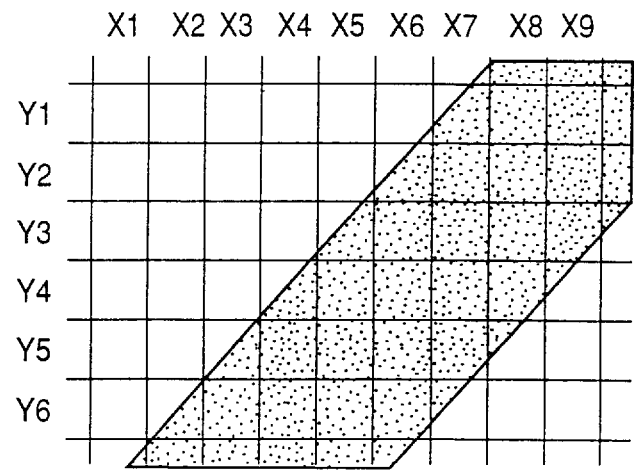
FIG. 14 is an enlarged view of a portion of the bit map pattern of FIG. 13.
FIG. 15 is a diagram showing an image data pattern of picture element values of the image data for the bit map pattern of FIG. 14.
Figures 18A, 18B:
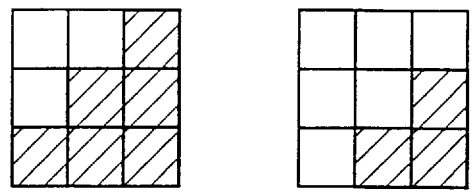
FIGS. 18A through 18D are diagrams for explaining a set of matching patterns for use with the pattern detection window of FIGS. 17A through 17E.
Figures 18C, 18D:
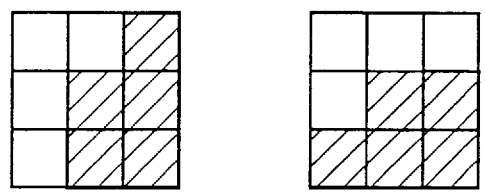

FIG. 14 is an enlarged view of a portion of the bit map pattern of FIG. 13. FIG. 15 shows an image data pattern of picture element values of the image data for the bit map pattern of FIG. 14. Each of the picture elements of FIG. 15 is represented by image data consisting of 8 bits, and the value of each picture element ranges from 0 (white) to 255 (black) in decimal. In FIGS. 14 and 15, Xn (n=1, ..., 9) indicates a coordinate in the main scanning direction, and Ym (m=1, ..., 6) indicates a coordinate in the sub-scanning direction.

FIGS. 16A through 16E show a pattern detection window which is applied to the image data pattern of FIG. 15. The pattern detection window includes a matrix of 3×3 picture element values. In the pattern detection windows of FIGS. 16A through 16E, the 3×3 picture elements values are shifted in the main scanning direction by one picture element.

A detection of the reference pattern is performed prior to the measurement of errors of the positions of the read image data. This detection of the reference pattern is performed in order to determine whether one of the slanting lines of the reference pattern exists in the read image data. At the start of the detection of the reference pattern, the pattern detection window including a predetermined number of picture elements is set in the read image data of the reference pattern.

In the pattern detection window of FIG. 16A, a sum "Pa" of the values of the three picture elements (X2, Y1), (X3, Y1) and (X2, Y2) which are located at the upper right portion of the window, and a sum "Qa" of the values of the three picture elements (X4, Y2), (X3, Y3) and (X4, Y3) which are located at the lower left portion of the window are computed as follows.

$$Pa = (X2, Y1) + (X3, Y1) + (X2, Y2)$$
$$= 3 + 1 + 1 = 5$$
$$Qa = (X4, Y2) + (X3, Y3) + (X4, Y3)$$
$$= 3 + 4 + 8 = 15$$

Similarly, in the pattern detection windows of FIGS. 16B through 16E, $$Pb = (X3, Y1) + (X4, Y1) + (X3, Y2)$$
$$= 1 + 4 + 2 = 7$$
$$Qb = (X5, Y2) + (X4, Y3) + (X5, Y3)$$
$$= 13 + 8 + 201 = 222$$
$$Pc = (X4, Y1) + (X5, Y1) + (X4, Y2)$$
$$= 4 + 2 + 3 = 9$$
$$Qc = (X6, Y2) + (X5, Y3) + (X6, Y3)$$
$$= 216 + 201 + 250 = 667$$
$$Pd = (X5, Y1) + (X6, Y1) + (X5, Y2)$$
$$= 2 + 18 + 13 = 33$$
$$Qd = (X7, Y2) + (X6, Y3) + (X7, Y3)$$
$$= 248 + 250 + 252 = 750$$
$$Pe = (X6, Y1) + (X7, Y1) + (X6, Y2)$$
$$= 18 + 220 + 216 = 454$$
$$Qe = (X8, Y2) + (X7, Y3) + (X8, Y3)$$
$$= 250 + 252 + 249 = 751$$

Then, a difference "R" between the sum of the values of the upper-right picture elements and the sum of the values of the lower-left picture elements for each of the pattern detection windows of FIGS. 16A through 16E is computed as follows.

Ra=15−5=10

Rb=222−7=215

Rc=667−9=658

Rd=750−33=717

Re=751−454=297

When the difference "R" is greater than a reference value, it is determined that one of the slanting lines of the reference pattern exists in the read image data within the pattern detection window. For example, in the above-mentioned case, if the reference value is preset at 500, it is determined that one of the slanting lines of the reference pattern exists in the read image data within each of the pattern detection windows of FIG. 16C and 16D.

FIGS. 17A through 17E show a pattern detection window which is applied to another image data pattern. Similarly to that of FIGS. 16A through 16E, the pattern detection window includes a matrix of 3×3 picture element values. In the pattern detection windows of FIGS. 17A through 17E, the 3×3 picture elements values of each of the windows of FIGS. 16A through 16E are converted into one of the binary numbers "0" and "1" by comparing them with a threshold value (=128).

In each of the pattern detection windows of FIGS. 17A through 17E, a sum "P" of the values of the three picture elements located at the upper right portion of the window, and a sum "Q" of the values of the three picture elements located at the lower left portion of the window are computed as follows.

$Pa = (X2, Y1) + (X3, Y1) + (X2, Y2)$
$= 0 + 0 + 0 = 0$
$Qa = (X4, Y2) + (X3, Y3) + (X4, Y3)$
$= 0 + 0 + 0 = 0$
$Pb = (X3, Y1) + (X4, Y1) + (X3, Y2)$
$= 0 + 0 + 0 = 0$
$Qb = (X5, Y2) + (X4, Y3) + (X5, Y3)$
$= 0 + 0 + 1 = 1$
$Pc = (X4, Y1) + (X5, Y1) + (X4, Y2)$
$= 0 + 0 + 0 = 0$
$Qc = (X6, Y2) + (X5, Y3) + (X6, Y3)$
$= 1 + 1 + 1 = 3$
$Pd = (X5, Y1) + (X6, Y1) + (X5, Y2)$
$= 0 + 0 + 0 = 0$
$Qd = (X7, Y2) + (X6, Y3) + (X7, Y3)$
$= 1 + 1 + 1 = 3$
$Pe = (X6, Y1) + (X7, Y1) + (X6, Y2)$
$= 0 + 1 + 1 = 2$
$Qe = (X8, Y2) + (X7, Y3) + (X8, Y3)$
$= 1 + 1 + 1 = 3$

Then, a difference "R" between the sum of the values of the upper-right picture elements and the sum of the values of the lower-left picture elements for each of the pattern detection windows of FIGS. 17A through 17E is computed as follows.

Ra=0–0=0
Rb=1–0=1
Rc=3–0=3
Rd=3–0=3
Re=3–2=1

When the difference "R" is greater than a reference value, it is determined that one of the slanting lines of the reference pattern exists in the read image data within the pattern detection window. For example, in the above-mentioned case, if the reference value is preset at 2, it is determined that one of the slanting lines of the reference pattern exists in the read image data within each of the pattern detection windows of FIG. 17C and 17D.

In the embodiment of FIGS. 17A through 17E, it is possible to make the computation of the sums and the differences simpler than that of the embodiment of FIGS. 16A through 16E.

FIGS. 18A through 18D show a set of matching patterns for use with the pattern detection window of FIGS. 17A through 17E. In FIGS. 18A through 18D, each of white areas indicates that the picture element value is the binary number "0", and each of black areas indicates that the picture element value is the binary number "1". The matching patterns of FIGS. 18A through 18D may be used to detect the reference pattern in the read image data.

When the matching patterns of FIGS. 18A through 18D are used, the read image data is converted into one of the binary numbers "0" and "1" by comparing them with the threshold value (=128), as shown in FIGS. 17A through 17E. The pattern detection window including the binary values of the converted image data is compared with each of the matching patterns of FIGS. 18A through 18D. When the pattern detection window accords with one of the matching patterns of FIGS. 18A through 18D, it is determined that one of the slanting lines of the reference pattern exists in the read image data within the pattern detection window. In the above case, the pattern detection windows of FIG. 17C and FIG. 17D accord with the matching patterns of FIG. 18B and FIG. 18A, respectively. Therefore, it is determined that one of the slanting lines of the reference pattern exists in the read image data within each of the pattern detection windows of FIGS. 17C and 17D.

The pattern detection window of the present embodiment has the size of 3×3 picture elements. Alternatively, a pattern detection window having a different size may be used instead. The greater the size of the pattern detection window is, the higher the level of accuracy of the detection of the reference pattern is. However, the pattern detection window having a greater size would require more processing time and higher cost.

Figure 19:
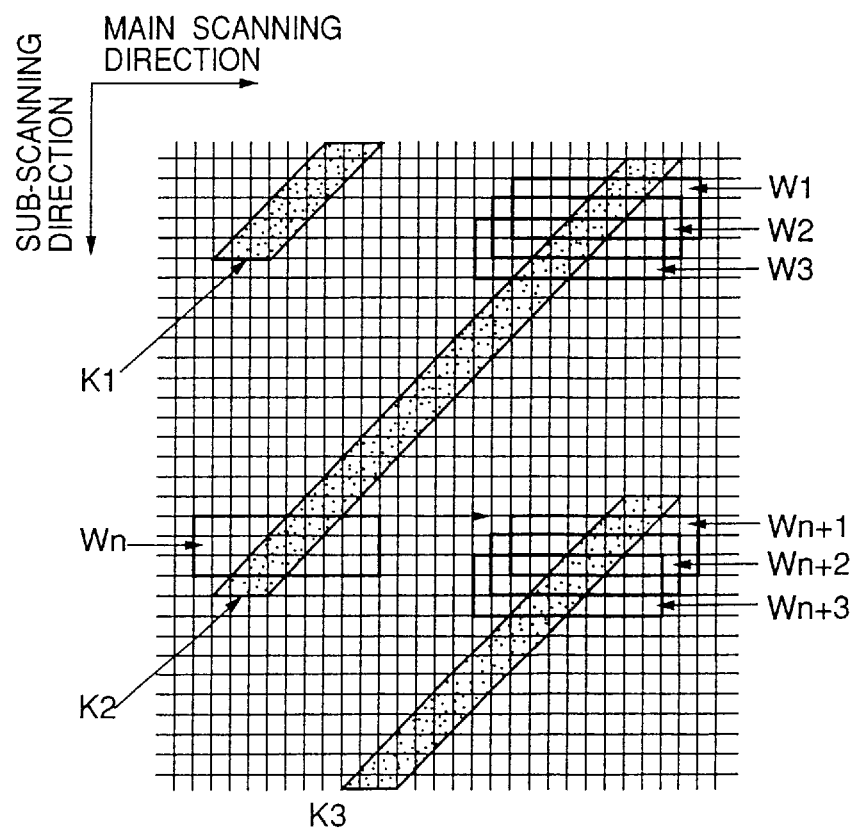
FIG. 19 is a diagram for explaining a bit map pattern of the read image data of the reference pattern in which two or more slanting lines are included.

FIG. 19 shows a bit map pattern of the read image data of the reference pattern in which two or more slanting lines are included. In the example of FIG. 19, three slanting lines "K1", "K2" and "K3" are included in the bit map pattern.

The error measurement part 323 sets an error measurement window "W" having a size of 10×3 picture elements in the bit map pattern of FIG. 19 (or the read image data of the reference pattern). A first error measurement window "W1" is set in the slanting line "K2" of the read image data, and a determination of the position of the center of mass of the window "W1" in the main scanning direction is performed. The window "W1" is shifted along the slanting line "K2" (in the 45° lower left-hand direction) by one picture element, so that a second pattern detection window "W2" is set. The determination of the position of the center of mass of the window in the main scanning direction and the shifting of the window along the slanting line "K2" by one picture element are repeated until a final error measurement window "Wn" is set at the edge of the slanting line "K2".

After the final error measurement window "Wn" for the slanting line "K2" is set, the window "Wn" is shifted in the main scanning direction so that a first error measurement window "Wn+1" is set in the slanting line "K3" of the read image data. The determination of the position of the center of mass of the window in the main scanning direction and the shifting of the window along the slanting line "K2" by one picture element are repeated in the same manner.

If there is no error of the position of the read image data in the case of the 45° slanting line "K2", the positions of the centers of mass of the error measurement windows "W1" through "Wn" would be displaced in the main scanning direction by one picture element (which is the same as the quantity of the shifting of the window). If the positions of the centers of mass of the error measurement windows "W1" through "Wn" are not displaced in the main scanning direction by one picture element, it can be determined that an error of the position of the read image data exists due to the variation of the sub-scanning speed of the image sensors 307. By utilizing this principle, the error measurement part 323 of this embodiment measures an error of the position of the read image data based on the displacement of the center of mass of the error measurement window in the main scanning direction when it is shifted and based on the quantity of the shifting of the error measurement window in the main scanning direction. The quantity of the shifting is determined with respect to the line clock signal on which the time of start of the sub-scanning by the image sensors 307 is based.

In the present embodiment, it is assumed that the error of the position of the read image data is caused by the variation of the sub-scanning speed of the image sensors 307 only.

Figure 20:
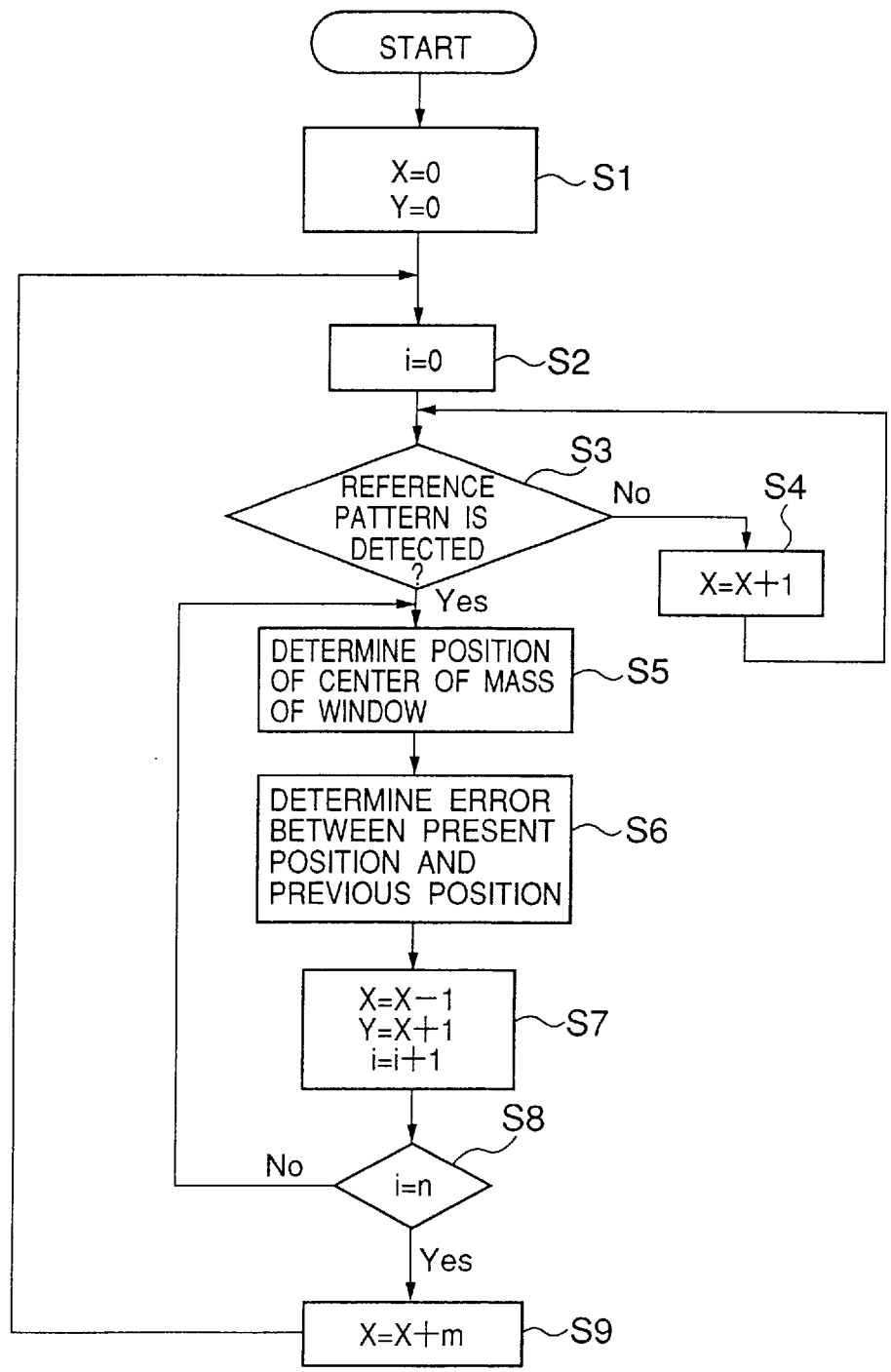
FIG. 20 is a flowchart for explaining a procedure performed by an error measurement part in the image reading apparatus of FIG. 12.

FIG. 20 shows a center-of-mass determination procedure performed by the error measurement part 323 of FIG. 12 with respect to the read image data of FIG. 19.

As shown in FIG. 20, the error measurement part 323 at step S1 resets a coordinate X of the main scanning direction and a coordinate Y of the sub-scanning direction to zero (X=0, Y=0). The values of the coordinates X and Y when they are incremented or decremented indicate the position of the center picture element of the pattern detection window having the size of 3×3 picture elements.

Step S2 resets a counter "i" to zero (i=0). The value of the counter "i" when it is incremented indicates the number of the error measurements performed for the slanting line of interest.

Step S3 makes a determination as to whether one of the slanting lines of the reference pattern exists in the image data within the pattern detection window. The slanting line of the reference pattern detected at this step is the slanting line of interest.

When the result at the step S3 is negative, step S4 shifts the pattern detection window in the main scanning direction by one picture element (X=X+1). After the step S4 is performed, the above step S3 is repeated.

When the result at the step S3 is affirmative, step S5 sets the error measurement window having the size of 10×3 picture elements in the slanting line of interest (or the read image data of the reference pattern). For the first time, the first error measurement window W1 is set. Further, step S5 determines a position of the center of mass of the error measurement window in the main scanning direction.

After the step S5 is performed, step S6 determines an error between the presently determined position of the center of masse of the window and the previously determined position. Step S7 shifts the error measurement window along the slanting line of interest by decrementing the coordinate X and incrementing the coordinate Y (X=X−1, Y=Y+1). Further, step S7 increments the counter "i" (i=i+1).

Step S8 makes a determination as to whether the value of the counter "i" is equal to a given total number "n" of the error measurements performed for the slanting line of interest.

When the result at the step S8 is negative, the above steps S5 through S7 are repeated.

When the result at the step S8 is affirmative, it is determined that setting the final error measurement window for the slanting line of interest is finished. Step S9 shifts the error measurement window in the main scanning direction by increasing the coordinate X by a given value "m", so that a first error measurement window "Wn+1" is set in the next slanting line of the read image data of the reference pattern.

After the step S9 is performed, the above steps S2 through S8 are repeated.

Figures 21, 22:
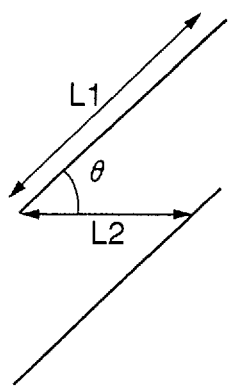
FIG. 21 is a diagram for explaining a procedure performed by the error measurement part of FIG. 12.
FIG. 22 is a diagram for explaining an arrangement of the slanting lines of the reference pattern in the image reading apparatus of FIG. 12.

FIG. 21 shows an example of the determination of the position of the center of mass of the error measurement window performed (or the step S5 of FIG. 20) by the error measurement part 323 of FIG. 12.

In FIG. 21, an image data pattern of picture element values of the error measurement window having the size of 10×3 picture elements is shown. The value of each picture element of the error measurement window is represented by image data consisting of 8 bits, and it ranges from 0 to 255 in decimal. In FIG. 21, the coordinate X of the main scanning direction of each picture element is indicated by X0, X1, ..., X9, and the coordinate Y of the sub-scanning direction of each picture element is indicated by Y0, Y1, Y2.

In order to determine the position of the center of mass of the error measurement window in the main scanning direction, a sum Zi (i=0 to 9) of three picture element values of each column of the error measurement window is computed. As shown, in the example of FIG. 21, Z0=18, Z1=50, ..., and Z9=14 are obtained.

Suppose that the position of the center of mass of the error measurement window in the main scanning direction is indicated by Rm. The moment on the error measurement window around the center of mass is equal to zero. Therefore, the following equation is satisfied.

$$Z0(Rm-0)+Z1(Rm-1)+\ldots +Z9(Rm-9)=0$$

Solving the above equation by substituting the values of the sums Zi into it yields Rm=4.362. The error measurement part 323 of this embodiment determines the position of the center of mass of the error measurement window in the main scanning direction.

In the case of the bit map pattern of FIG. 19 in which two or more slanting lines are included, the determination of the position of the center of mass of the error measurement window is performed as follows.

When the window is shifted from one slanting line to another slanting line, the positions of the center of mass of the window before and after the shifting between the two slanting lines are considerably different from each other unless the distance between the slanting liens in the main scanning direction is indicated by an integral multiple of the size of each picture element. The correction of the determined position after the shafting of the window is needed in order to eliminate the error.

For example, in the case of the bit map pattern of FIG. 19, suppose that the position Rn of the center of mass of the final error measurement window Wn for the slanting line K2 is determined to be 4.65, the position Rn+1 of the center of mass of the first error measurement window Wn+1 for the slanting line K3 is determined to be 4.38, the position Rn+2 of the center of mass of the second error measurement window Wn+2 is determined to be 4.40, and the position Rn+3 of the center of mass of the third error measurement window Wn+3 is determined to be 4.41. A difference "dR" between the positions of the center of mass of the window before and after the shifting of the window between the two slanting lines is computed as follows.

$$dR=Rn-Rn+1=4.65-4.38=0.27$$

The corrected position Rn+2' of the center of mass of the second error measurement window Wn+2 and the corrected position Rn+3' of the center of mass of the third error measurement window Wn+3 are obtained as follows.

$$Rn+2'Rn+2+dR=4.40+0.27=4.67$$

$$Rn+3'=Rn+3+dR=4.41+0.27=4.68$$

In the case of the read image data in which two or more slanting lines are included, the determination of the position of the center of mass of the error measurement window can be performed in the manner as described above. In this case, it is necessary that both the slanting lines K2 and K3 in the read image data of the reference pattern exist in the main scanning direction at the same time FIG. 22 shows an arrangement of the slanting lines of the reference pattern in the image reading apparatus of FIG. 12.

As shown in FIG. 22, the slanting lines of the reference pattern have a length "L1" and are at an angle "θ" to the main scanning direction. Suppose that the positions of edges of the slanting lines in the main scanning direction are the same, and a distance between the two slanting lines in the main scanning direction is indicated by "L2". If the slanting lines are arranged such that the formula: L2<L1·cos θ is satisfied, the slanting lines overlap each other in the sub-scanning direction. This makes it possible to continuously perform the determination of the position of the center of mass of the error measurement window even when the error measurement window is shifted from one slanting line to another slanting line in the main scanning direction.

In the present embodiment, it is assumed that the picture elements are squares and the slanting lines of the reference pattern are at 45 degrees to the sub-scanning direction. Therefore, the error measurement part 323 directly measures an error of the position of the read image data in the sub-scanning direction based on the displacement of the center of mass of the error measurement window in the main scanning direction when it is shifted and based on the quantity of the shifting of the error measurement window in the main scanning direction. However, when the picture elements are not squares or when the slanting lines of the reference pattern are not at 45 degrees to the sub-scanning direction, it is necessary to perform a conversion based on the result of the determination of the position of the center of mass of the error measurement window in order to determine a correct error of the position of the read image data in the sub-scanning direction.

FIGS. 23A through 23E show a reference-position determination procedure performed by the error measurement part 323 of FIG. 12.

FIG. 23A shows an image of the slanting lines of the reference pattern. In FIG. 23A, the vertical axis indicates the main scanning direction, and the horizontal axis indicates the sub-scanning direction. The left-end slanting line of FIG. 23A is used for both the error measurement and the reference-position determination. Each of rectangles indicated by dotted lines in FIG. 23A denotes the error measurement window which is set in the left-end slanting line of the reference pattern.

FIG. 23B shows a sequence of line clock signals which are output by the system control part 320 each time the sub-scanning is performed by the image sensors 307. The line clock signals are timing signals which are generated in accordance with oscillations of a crystal oscillator of the system control part 320. The oscillations of the crystal oscillator are independent of the variation of the sub-scanning speed of the image sensors. In FIG. 23B, only the leading edges or trailing edges of the line clock signals are shown, and the entire waveform of the line clock signals is not shown.

FIGS. 23C, 23D and 23E show the timings of read-out signals of the color component values R, G and B of the image data output by the image sensors 307. As shown, the edges of the read-out signals each of which indicates the start of the reading of the reference pattern by one of the R, G and B image sensors 307 are separated from each other in the sub-scanning direction. This is because the R, G and B image sensors 307 are arranged at separate positions in the sub-scanning direction.

As indicated by dotted lines in FIGS. 23C, 23D and 23E, the error measurement and the reference-position determination are performed prior to the start of the reading of the reference pattern by each of the R, G and B image sensors 307. When the carriage (not shown) of the image sensors 307 over the document setting base of the image reading apparatus is moved and reaches the starting position at the edge of the original image, the reading of the reference pattern by the image sensors 307 is started.

In the present embodiment, the reference-position determination procedure is carried out in order to realize a higher level of accuracy than the level of accuracy equivalent to one of the intervals between the line clock signals. The error measurement part 323 sets an error measurement window in the image data of the left-end slanting line of the reference pattern, determines a position of the center of mass of the error measurement window in the main scanning direction, and sets the position of the center of mass of the window as the reference position "A". The value of the reference position "A" being determined is stored in a memory of the system control part 320. In FIG. 23A, a position of the image of the reference pattern which corresponds to this reference position is indicated by "A".

The determination of the position of the center of mass of the window is performed in a manner similar to that of the procedure of FIG. 20.

As indicated by the dotted lines in FIG. 23A, a first error measurement window is set in the left-end slanting line of the read image data, and a determination of the position of the center of mass of the window in the main scanning direction is performed. The window is shifted along the left-end slanting line by one picture element, so that a second pattern detection window is set. The determination of the position of the center of mass of the window in the main scanning direction and the shifting of the window along the slanting line by one picture element are repeated.

The determined position of the center of mass of each error measurement window is compared with the value of the reference position "A" stored in the memory of the system control unit 320, and it is detected whether the determined position for each error measurement window exceeds the stored value of the reference position "A". This procedure is repeated until the determined position exceeds the stored value. The determined positions of the centers of mass of the windows before and after the determined position exceeds the stored value, as well as the times of the line clock signals before and after the determined position exceeds the stored value are stored in the memory of the system control unit 320.

FIG. 24 shows a linear interpolation procedure performed by the error measurement part 323 of FIG. 12. The linear interpolation procedure of FIG. 24 is performed in order to determine a precise time between the times of the line clock signals, the precise time corresponding to the reference position "A". In FIG. 24, the determined positions of the centers of mass of the windows before and after the determined position exceeds the stored value "A" are indicated by "gn−1" and "gn", and the times of the line clock signals before and after the determined position exceeds the stored value "A" are indicated by "clock#(n−1)" and "clock#n".

As shown in FIG. 24, the precise time which corresponds to the reference position is computed by a linear interpolation from "gn−1", "gn", "clock#(n−1)", "clock#n", and the stored value "A". A fractional part of the precise time being computed is rounded to $\frac{1}{16}$ of the intervals between the line clock signals. In the example of FIG. 24, the "$\frac{12}{16}$" point between "clock#(n−1)" and "clock#n" is determined as the precise time. The determined position is an intrinsic value which is specific to the image reading apparatus.

Figure 25:
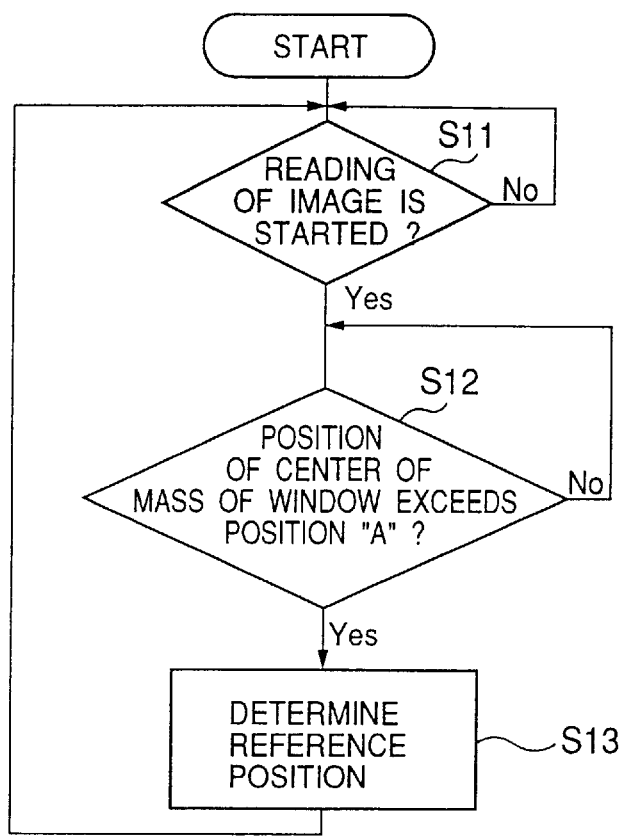
FIG. 25 is a flowchart for explaining a procedure performed by the error measurement part of FIG. 12.

FIG. 25 shows a center-of-mass position determination procedure performed by the error measurement part 323 of FIG. 12.

As shown in FIG. 25, the error measurement part 323 at step S11 makes a determination as to whether the reading of the image of the reference pattern by the image sensors 307 is started. After the carriage of the image sensors 307 is separated from its home position, the reading of the image of the reference pattern by the image sensors 307 is started. When the result at the step S11 is negative, the step S11 is repeated.

When the result at the step S11 is affirmative, step S12 makes a determination as to whether the position of the center of mass of each error measurement window exceeds the stored value of the reference position "A". As described above, the error measurement window is set in the left-end slanting line of the reference pattern, and shifted along the left-end slanting line by one picture element. When the result at the step S12 is negative, the step S12 is repeated.

When the result at the step S12 is affirmative, the determined positions of the centers of mass of the windows before and after the determined position exceeds the stored value "A", and the times of the line clock signals before and after the determined position exceeds the stored value "A" are stored in the memory of the system control part 320. Then, step S13 determines the precise time between the line clock signals which corresponds to the reference position "A" as shown in FIG. 24. After the step S13 is performed, the above steps S11–S13 are repeated. The reference position is used by the error correcting part 324 to correct the errors of the positions of the color component values of each picture element.

Figure 26:
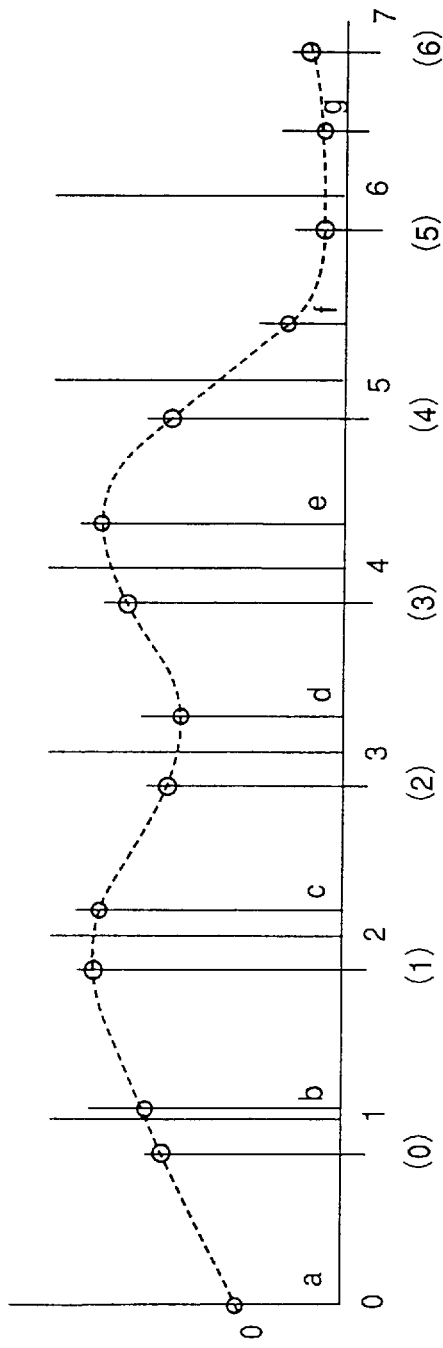
FIG. 26 is a diagram for explaining a procedure performed by an error correcting part in the image reading apparatus of FIG. 12.

FIG. 26 shows an error correction procedure performed by the error correcting part 324 of FIG. 12. In FIG. 26, the vertical axis indicates the value of each picture element after the shading correction, which is supplied from the shading correction unit 322 to the input of the error measurement unit 323. In the case of image data consisting of 8 bits, and the value of each picture element ranges from 0 (white) to 255 (black) in decimal.

In FIG. 26, the horizontal axis indicates the position of each picture element on the scanning line which is read by the image sensors 307. The positions indicated by the integers 0, 1, 2, . . . , 6, 7 in FIG. 26 are precise positions that are determined by the line clock signals generated in accordance with oscillations of the crystal oscillator of the system control part 320. The positions indicated by the integers in parentheses (0), (1), . . . , (6) in FIG. 26 are positions which deviate from the precise positions 0, 1, . . . , 6 by $12/16$ of the intervals between the line clock signals. Each of the intervals between the precise positions on the horizontal axis is divided into 16 equal divisions.

The reading resolution (for example, 400 dpi) of the image reading apparatus corresponds to the intervals between the line clock signals, and the error correction processing resolution of the present embodiment is $1/16$ of the intervals between the line clock signals.

FIG. 26 shows a case in which the image reading apparatus has a variation of the sub-scanning speed of the image sensors which corresponds to 6% of the desired sub-scanning speed. A pitch which is equivalent to 6% of the desired sub-scanning speed is a $1/16$ dot pitch. In the case of FIG. 26, there is the variation of the sub-scanning speed which is equivalent to a $1/16$ dot pitch, and the data of the picture elements are read by the image sensors 307 at the deviating positions which are indicated by "b", "c", . . . , "g" in FIG. 26. In the desired case in which there is no variation of the sub-scanning speed, the data of the picture elements are read at the precise positions which are indicated by "1", "2", . . . , "6" in FIG. 26.

The error correcting part 324 of the present embodiment has the same structure of the above-described line correcting unit of FIG. 5 or FIG. 7. Similarly to the embodiment of FIGS. 5 through 11, the error correction part 324 of the present embodiment carries out the cubic-function-convolution process of FIG. 8 in order to perform the interpolation for the correction of the positions of the color component values R, G and B.

Similarly to the embodiment of FIGS. 5 through 11, the error correcting part 324 outputs image data having the first color value (for example, R) of each picture element at a corrected position based on the image data from the error measurement part 323 by using the cubic-function-convolution process of FIG. 8, the cubic-function-convolution process having a set of correction factors determined based on a distance between the first error (output from the error measurement part 323) and the reference position.

Further, the error correction part 324 outputs image data having the second color value (for example, G) of each picture element at a corrected position based on the image data from the error measurement part 323 by using the cubic-function-convolution process, the cubic-function-convolution process having a set of correction factors determined based on a distance between the second error (output from the error measurement part 323) and the reference position.

In the embodiment of FIG. 9, eight imaginary points are set between two sampling points, the eight imaginary points located at equal intervals of the $1/8$ dot pitch in the sub-scanning direction. In the present embodiment, sixteen imaginary points are set between the two precise positions which are determined by the line clock signals output by the system control part 324.

Figure 27:
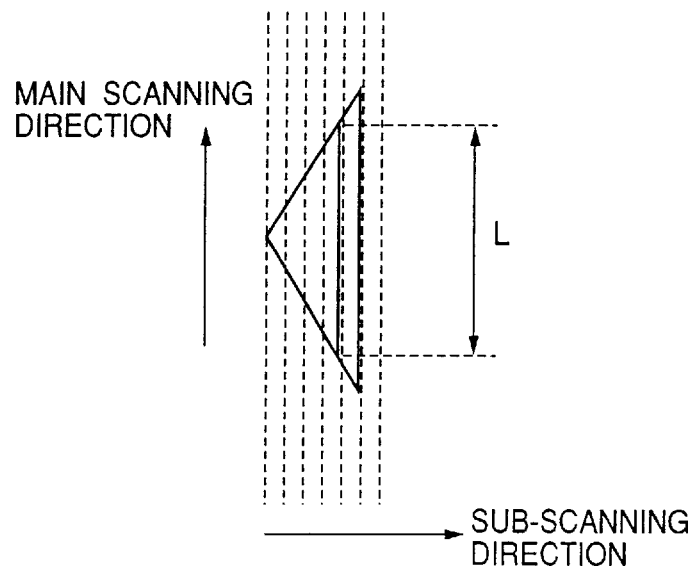
FIG. 27 is a diagram showing an example of a mark used for the reference-position determination.
Figure 28:
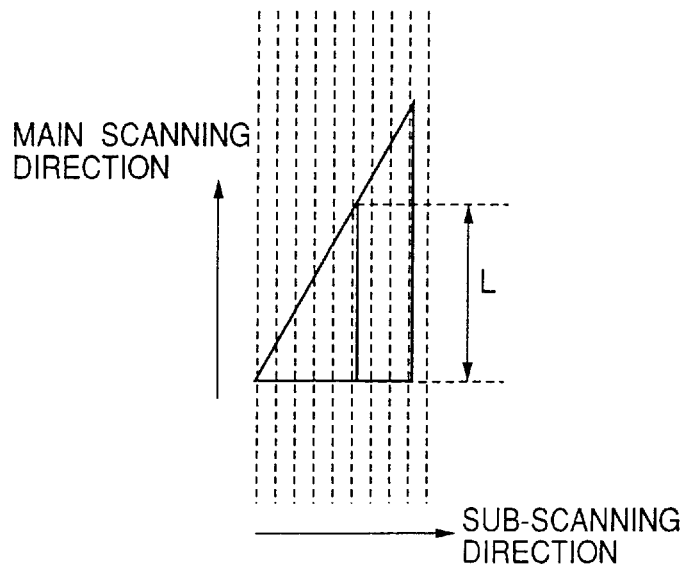
FIG. 28 is a diagram showing another example of the mark used for the reference-position determination.

FIG. 27 shows an example of a mark used for the reference-position determination, and FIG. 28 shows another example of the mark used for the reference-position determination. The marks of FIGS. 27 and 28 are provided at the leading edge of the reference pattern instead of the left-end slanting line.

The mark of FIG. 27 is described in a pattern of an isosceles triangle, and the triangle has two equal sides slanting to the sub-scanning direction. The mark of FIG. 28 is described in a pattern of a right-angled triangle, and the triangle has one side extending in the sub-scanning direction and the longest side slanting to the sub-scanning direction.

In FIGS. 27 and 28, dotted lines which vertically extend and equally spaced in the sub-scanning direction indicate the timing of the line clock signals being output by the system control part 320 each time the sub-scanning is performed by the image sensors 307.

In the embodiment of FIG. 23A, the reference-position determination is carried out by using the left-end slanting line of the reference pattern and determining the position of the center of mass of the window with respect to the left-end slanting line.

In the embodiments of FIGS. 27 and 28, when the sub-scanning by the image sensors 307 is processed according to the elapse of time, a distance between intersections of the two sides of the triangular mark in the main scanning direction is increased. The distance between the intersections is measured each time the sub-scanning is performed by the image sensors 307. A reference distance "L" is preset with respect to each of the marks of FIGS. 27 and 28. The determined distances before and after the determined distance exceeds the reference distance "L", as well as the times of the line clock signals before and after the determined distance exceeds the reference distance "L" are stored in the memory of the system control part 320. In this manner, by using the marks of FIGS. 27 and 28, the reference-position determination is carried out.

Figure 29:
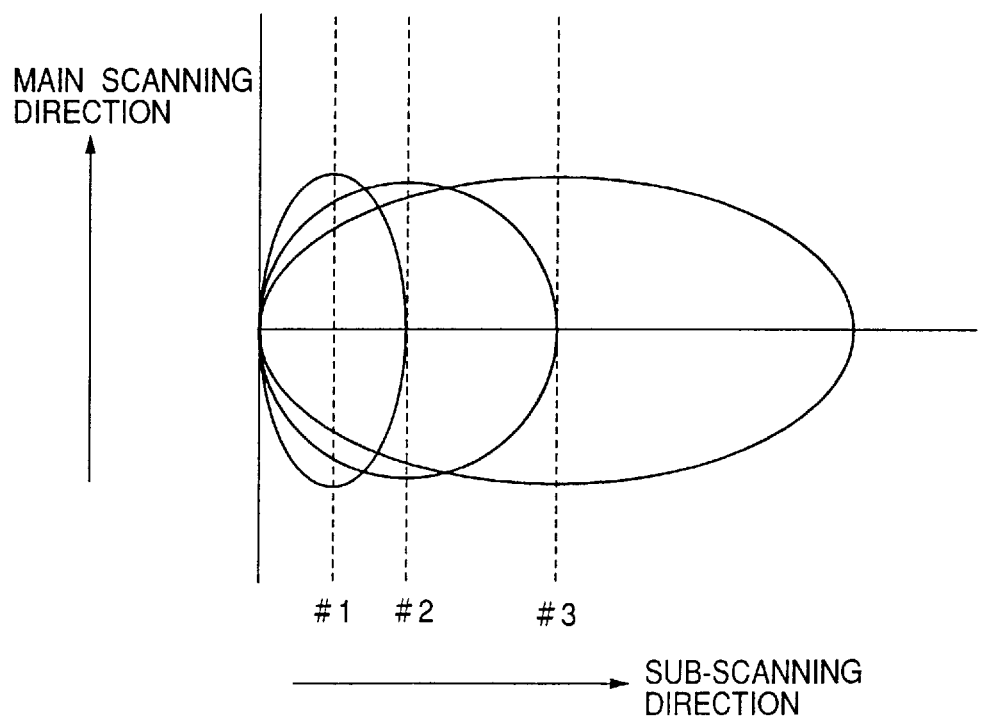
FIG. 29 is a diagram showing a further example of the mark used for the reference-position determination.

FIG. 29 shows a further example of the mark used for the reference-position determination. Similarly, the mark of FIG. 29 is provided at the leading edge of the reference pattern instead of the left-end slanting line.

The mark of FIG. 29 is described in a pattern of a circle having an appropriate diameter. When there is no variation of the sub-scanning speed of the image sensors 307, the image read from the mark by the image sensors 307 is a pattern of the circle. When the sub-scanning speed of the image sensors 307 is twice as much as the reference speed, the image read from the mark by the image sensors 307 is a pattern of an ellipse having the smaller diameter which is half the diameter of the circle. This ellipse is called the flattened ellipse. When the sub-scanning speed of the image sensors 307 is half as much as the reference speed, the image read from the mark by the image sensors 307 is a pattern of an ellipse having the larger diameter which is twice the diameter of the circle. This ellipse is called the elongated ellipse.

In the embodiment of FIG. 29, the reference-position determination is carried out by using the mark in the pattern of the circle and determining the position of the center of mass of the circle or the ellipse with respect to the mark. In the case of the flattened ellipse, the position of the center of mass of the ellipse is indicated by "#1" in FIG. 29. In the case of the circle, the position of the center of mass of the circle is indicated by "#2" in FIG. 29. In the case of the elongated ellipse, the position of the center of mass of the ellipse is indicated by "#3" in FIG. 29.

Figure 30:
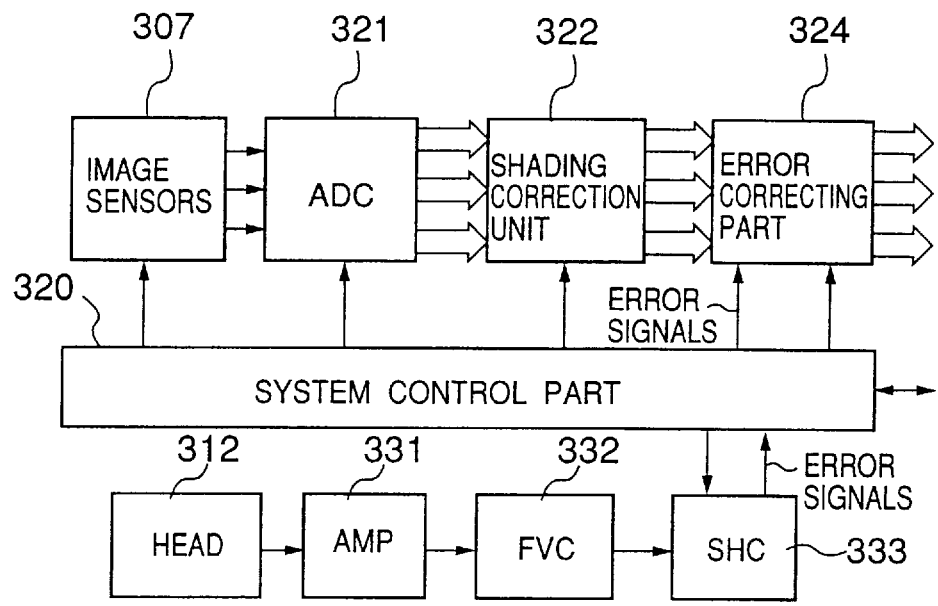
FIG. 30 is a block diagram showing a variation of the image reading apparatus of FIG. 12.
Figure 31:
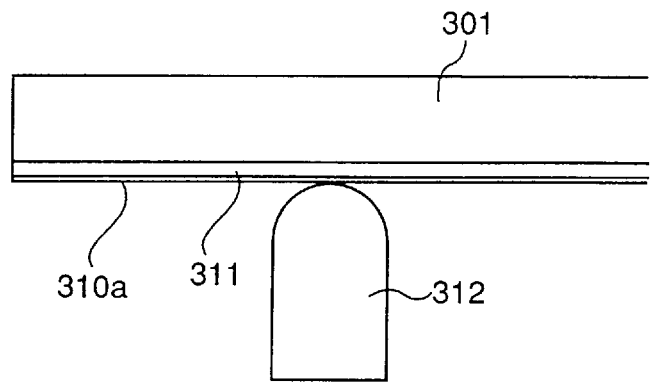
FIG. 31 is a diagram showing a magnetic tape and a magnetic head in the image reading apparatus of FIG. 30.

Next, FIG. 30 shows a variation of the image reading apparatus of FIG. 12. FIG. 31 shows a magnetic tape and a magnetic head in the image reading apparatus of FIG. 30.

In the image reading apparatus of FIG. 30, a magnetic tape 310a on which a signal having a given frequency is recorded is arranged on the bottom of a contact glass of a document setting base 301 as shown in FIG. 31. The reference pattern in the embodiment of FIG. 12 is replaced by the magnetic tape 310a in this embodiment. The magnetic tape 310a extends in the main scanning direction. The signal recorded on the magnetic tape 310a is used to measure a variation of the sub-scanning speed (or the sub-scanning position) of the image sensors 307.

As shown in FIGS. 30 and 31, a magnetic head 312 is arranged on the carriage (not shown) of the image sensors 307. The magnetic head 312 is provided to read out the signal from the magnetic tape 310a of the document setting base 301. In the document setting base 301, the magnetic tape 310a extends from a standby portion preceding the leading edge of the reading range of the original image.

As shown in FIG. 31, a cushioning material 311 is arranged between the contact glass of the document setting base 301 and the magnetic tape 310a. The cushioning material 311 is provided to ensure the contact of the magnetic head 312 with the magnetic tape 310a. Further, the cushioning material 312 prevents the magnetic tape 310a from being damaged by an excessively great force of the magnetic head 312 on the magnetic tape 310a.

In the image reading apparatus of FIG. 30, the image sensors 307 are the same as the image sensors 307 of FIG. 12. The image sensors 307 respectively output signals which indicate the color component values (the R, G and B values) of each picture element from the original image. The output signals of the image sensors 307 are supplied to the analog-to-digital converter (ADC) 321.

The ADC 321 converts the output signals of the image sensors 307 into digital signals, each digital signal indicating a value of multiple-level image data for one of the color component values (the R, G and B values). The output signals of the ADC 321 are supplied to the shading correction unit 322.

The shading correction unit 322 performs a shading correction of the output signals of the ADC 321 by comparing an optical density of each of the output signals with the reference optical density. The shading correction unit 322 outputs the shading-corrected image signals to the error correcting part 324.

The system control part 320 controls the image sensors 307, the ADC 321, the shading correction unit 322, and the error correcting part 324. The system control part 320 performs a timing control and operational condition setting of these elements.

When the reading of the original image is started, the magnetic head 312 reads the signal from the magnetic tape 310a and converts the read signal into a signal having a measured frequency proportional the sub-scanning speed of the image sensors 307. The measured frequency of the signal read by the magnetic head 312 is about 10 times the repeated frequency of the line clock signals, and the measured frequency of the signal output by the magnetic head 312 can be set to be the speed data indicating a continuous quantity.

The signal at the output of the magnetic head 312 is amplified by a head amplifier 331. The resulting signal at the output of the head amplifier 331 is supplied to a frequency-to-voltage converter (FVC) 332. The FVC 332 converts the measured frequency of the signal into a voltage corresponding to the measured frequency. The voltage at the output of the FVC 332 is supplied to a sampling/holding circuit (SHC) 333. The SHC 333 performs the sampling and holding of the voltage output from the FVC 332. The SHC 333 outputs error signals to the system control part 320 as the result of the sampling and holding. The system control part 320 sends a timing signal to the SHC 333 in synchronism with the line clock signals. The sampling and holding is performed by the SHC 333 in synchronism with the timing signal. As the result, the system control part 320 receives the signals from the SHC at the timing synchronous with the line clock signals. The system control part 320 outputs the error signals to the error correcting part 324.

Based on the error signals from the system control part 320, the error correcting part 324 corrects the errors of the positions of the color component values of each picture element. The error correcting part 324 outputs the color component values of each picture element in which the errors are eliminated. The error correcting part 324 includes at least three line memories for the correction of the positional errors of the color component values of each picture element.

Other elements of the embodiment of FIGS. 30 and 31 are the same as corresponding elements of the embodiment of FIG. 12 unless otherwise specified.

Figure 32:
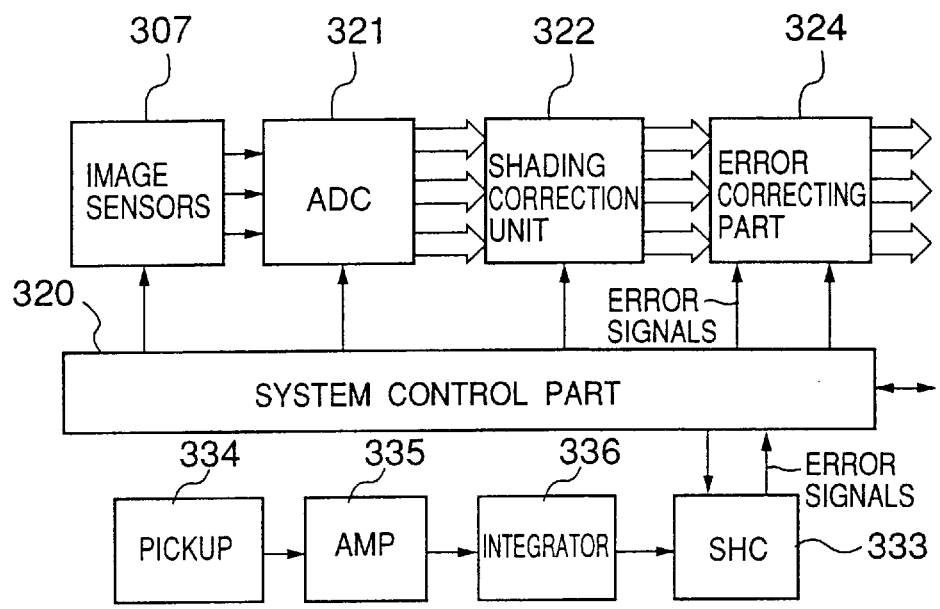
FIG. 32 is a block diagram showing another variation of the image reading apparatus of FIG. 12.

FIG. 32 shows another variation of the image reading apparatus of FIG. 12.

In the image reading apparatus of FIG. 32, a pickup 334 is provided to measure a variation of the sub-scanning speed of the image sensors 307. The pickup 334 is arranged on the carriage (not shown) of the image sensors 307. The pickup 334 measures a sub-scanning acceleration of the image sensors 307. The sub-scanning acceleration measured by the pickup 334 is amplified by a charge amplifier (AMP) 335. The resulting signal at the output of the charge amplifier 335 is supplied to an integrator 336. The integrator 336 converts the measured sub-scanning acceleration into a signal indicating a sub-scanning speed. The signal at the output of the integrator 336 is supplied to the SHC 333. The SHC 333 performs the sampling and holding of the signal output from the integrator 336. The SHC 333 outputs error signals to the system control part 320 as the result of the sampling and holding. The sampling and holding is performed by the SHC 333 in synchronism with the timing signal from the system control part 320. As the result, the system control part 320 receives the error signals from the SHC 333 at the timing synchronous with the line clock signals. The system control part 320 outputs the error signals to the error correcting part 324.

Other elements of the embodiment of FIG. 32 are the same as corresponding elements of the embodiment of FIG. 12 unless otherwise specified.

Figure 33:
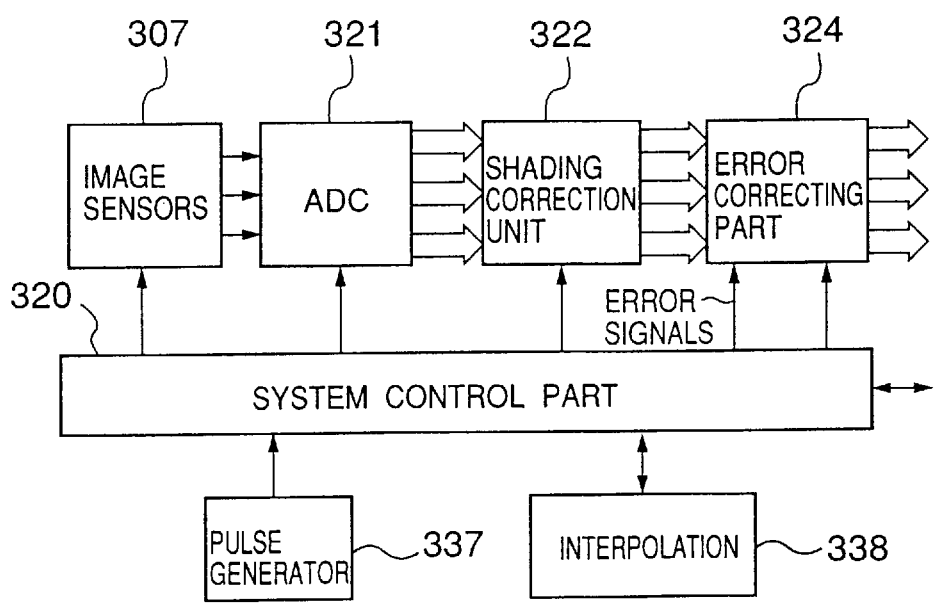
FIG. 33 is a block diagram showing still another variation of the image reading apparatus of FIG. 12.

FIG. 33 shows still another variation of the image reading apparatus of FIG. 12.

In the image reading apparatus of FIG. 33, an optical sensor (not shown) is arranged on the carriage of the image sensors 307, and a slit pattern having slits at given intervals is arranged such that the slit pattern is read by the optical sensor. A pulse generator 337 outputs a sequence of pulses in accordance with the signal output from the optical sensor. The pulses from the pulse generator 337 are supplied to the system control part 320, and the system control part 320 counts the pulses during a given period so that a sub-scanning speed of the image sensors 307 is measured.

In the image reading apparatus of FIG. 33, it is necessary that the frequency of the pulses from the pulse generator 337 is lower than the repeated frequency of the line clock signals due to the resolution of the optical sensor or the processing speed of the system control part 320. An interpolation unit 338 outputs a signal having a frequency synchronous with the frequency of the line clock signals, by performing an interpolation of the sub-scanning speed data output from the system control part 320. The system control part 320 outputs the error signals to the error correcting part 324 in synchronism with the signal output by the interpolation unit 338. The embodiment of FIG. 33 can provide the correction of the positional errors of the color component values of each picture element with low cost.

Other elements of the embodiment of FIG. 33 are the same as corresponding elements of the embodiment of FIG. 12 unless otherwise specified.

Figure 34:
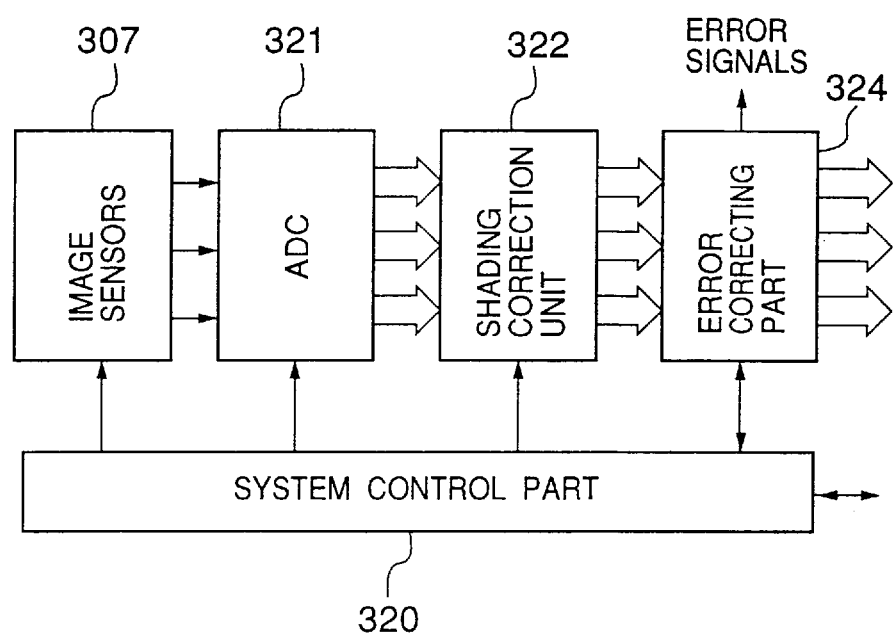
FIG. 34 is a block diagram showing a further variation of the image reading apparatus of FIG. 12.

FIG. 34 shows a further variation of the image reading apparatus of FIG. 12.

In the image reading apparatus of FIG. 34, the error correcting part 324 is arranged such that the error measurement part 323 of FIG. 12 is incorporated into the error correcting part 324. Therefore, the error correcting part 324 of this embodiment performs an error measurement based on the read image data from the shading correction unit 322, and outputs the error signals as the result of the error measurement and the read image data.

Further, based on the error signals, the error correcting part 324 corrects the errors of the positions of the color component values of each picture element. The error correcting part 324 outputs the color component values of each picture element in which the errors are eliminated.

Other elements of the embodiment of FIG. 34 are the same as corresponding elements of the embodiment of FIG. 12 unless otherwise specified.

Further, the present invention is not limited to the above-described embodiments, and variations and modifications may be made without departing from the scope of the present invention.

What is claimed is:

1. An image reading apparatus in which a set of image sensors for outputting color component values of each of a plurality of picture elements by reading out image data from an original image are arranged in parallel to a main scanning direction and at separate positions in a sub-scanning direction, said color component values including a first color value, a second color value and a third color value, said image reading apparatus comprising:

a reference pattern having slanting lines described in black on a white background, said reference pattern provided outside a reading range and read by the image sensors prior to the original image;

reference-position determining means for detecting one of the slanting lines in the reference pattern based on image data having the third color value output by one of the image sensors so that a position of the image data when said one of the slanting lines is detected is determined as a reference position;

first delay means having a plurality of first line memories for storing image data having the first color value read out from the original image having a plurality of lines, said first delay means delaying outputting of the image data from the first line memories line by line;

first determining means for determining image data having the first color value at first imaginary points based on the image data from the first delay means;

second delay means having a plurality of second line memories for storing image data having the second color value read out from the original image having the plurality of lines, said second delay means delaying outputting of the image data from the second line memories line by line;

second determining means for determining image data having the second color value at second imaginary points based on the image data from the second delay means;

error measurement means for selecting one of the first imaginary points whose image data has a minimum difference between the first color value and the third color value of the image data at the reference position based on the image data determined by the first determining means so that a first error is determined by the selected one of the first imaginary points, and for selecting one of the second imaginary points whose image data has a minimum difference between the second color value and the third color value of the image data at the reference position based on the image data determined by the second determining means so that a second error is determined by the selected one of the second imaginary points;

first line correcting means for outputting image data having the first color value of each picture element at a corrected position based on the image data from the first delay means by using a predetermined interpolation function, the interpolation function having a set of correction factors determined based on a distance between the first error and the reference position; and second line correcting means for outputting image data having the second color value of each picture element at a corrected position based on the image data from the second delay means by using the interpolation function, the interpolation function having a set of correction factors determined based on a distance between the second error and the reference position.

2. The image reading apparatus according to claim 1, wherein said reference pattern has the slanting lines which are at a given angle to the sub-scanning direction and parallel to each other.

3. The image reading apparatus according to claim 1, wherein said error measurement means determines a distance of the selected first imaginary point from the reference position so that a set of correction factors are determined based on the distance, and determines a distance of the selected second imaginary point from the reference position so that a set of correction factors are determined based on the distance.

4. The image reading apparatus according to claim 1, wherein said reference-position determining means determines a position of the image data as the reference position when an optical density of the image data read from the reference pattern is above a threshold value.

5. The image reading apparatus according to claim 1, wherein said reference-position determining means determines a position of the image data as the reference position when a rate of change of an optical density of the image data read from the reference pattern is above a reference rate value.

6. The image reading apparatus according to claim 1, further comprising:
means for storing image data having the third color value read out from one of the plurality of lines in the original image, and for delaying outputting of the stored image data line by line.

7. The image reading apparatus according to claim 1, further comprising:
means for detecting an end of the reading range when image data is read out from the original image by the image sensors.

8. The image reading apparatus according to claim 1, wherein said color component values of each picture element have a red value, a blue value, and a green value.

9. The image reading apparatus according to claim 1, wherein said first line correcting means and said second line correcting means perform a cubic function convolution process to output the image data having the first color value and the image data having the second color value.

10. The image reading apparatus according to claim 1, wherein said image sensors include an R image sensor, a G image sensor, and a B image sensor.

11. The image reading apparatus according to claim 1, wherein the interpolation function h(r) is defined as a function of the distance $|r|$ between the reference position and either one of the first error and the second error as follows, $$h(r) = 1 - 2|r|^2 + |r|^3 \quad \text{when } 0 \leq |r| < 1$$

$$h(r) = 4 - 8|r| + 5|r|^2 - |r|^3 \quad \text{when } 1 \leq |r| < 2$$

$$h(r) = 0 \quad \text{when } 2 \leq |r|.$$

12. The image reading apparatus according to claim 1, wherein said reference-position determining means detects an edge of one of the slanting lines in the reference pattern and determines a reference position by a position of the image data when the edge is detected.

13. The image reading apparatus according to claim 1, wherein said error measurement means determines a position of the center of mass of an error measurement window in the main scanning direction, the error measurement window being set in a bit map pattern of image data read by one of the image sensors.

14. The image reading apparatus according to claim 1, wherein said error measurement means measures an error of the position of the read image data based on a displacement of the center of mass of an error measurement window in the main scanning direction when the error measurement window is shifted and based on a quantity of the shifting of the error measurement window in the main scanning direction.

15. The image reading apparatus according to claim 14, wherein the quantity of the shifting is determined with respect to a line clock signal on which a time of start of a sub-scanning by the image sensors is based.

16. The image reading apparatus according to claim 14, wherein said reference-position determining means sets a window in the image data of a leading one of the slanting lines of the reference pattern, determines a position of the center of mass of the window in the main scanning direction, and determines the position of the center of mass of the window as the reference position.

17. The image reading apparatus according to claim 1, wherein the slanting lines of the reference pattern are at 45 degrees to the sub-scanning direction.

* * * * *